(12) United States Patent
Kikuchi

(10) Patent No.: US 7,978,390 B2
(45) Date of Patent: Jul. 12, 2011

(54) OPTICAL MODULATOR

(75) Inventor: Nobuhiko Kikuchi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 150 days.

(21) Appl. No.: 12/438,558

(22) PCT Filed: Jan. 11, 2007

(86) PCT No.: PCT/JP2007/050220
§ 371 (c)(1),
(2), (4) Date: Feb. 24, 2009

(87) PCT Pub. No.: WO2008/026326
PCT Pub. Date: Mar. 6, 2008

(65) Prior Publication Data
US 2009/0324247 A1     Dec. 31, 2009

(30) Foreign Application Priority Data

Aug. 30, 2006   (JP) .................................. 2006-233972

(51) Int. Cl.
*G02F 1/225* (2006.01)
(52) U.S. Cl. ...................................................... 359/238
(58) Field of Classification Search .................. 359/238, 359/276, 577, 578; 385/2, 3
See application file for complete search history.

(56) References Cited

U.S. PATENT DOCUMENTS

| 6,781,741 B2 * | 8/2004 | Uesaka ......................... 359/279 |
| 6,798,557 B1 | 9/2004 | Leven | |
| 2003/0030874 A1 | 2/2003 | Glingener et al. | |

FOREIGN PATENT DOCUMENTS

| EP | 1 345 072 | 9/2003 |
| JP | 2002-328347 | * 11/2002 |
| JP | 2004-348112 | 12/2004 |

OTHER PUBLICATIONS

Griffin et al., "10 Gbits/s Optical Differential Quadrature Phase Shift Key (DQPSK) Transmission using GaAs/AlGaAs Integration" OFC2002, paper PD-FD6, 2003.
Sekine et al., "Proposal and Demonstration of 10-Gsymbol/sec 16-ary (40 Gbits/s) Optical Modulation/Demodulation Scheme", paper We3.4.5, ECOC 2004, 2004.
Ip E et al, "Carrier synchronization for 3- and 4-bit-per-symbol optical transmission", Journal of Lightwave Technology IEEE USA, vol. 23, No. 12, Dec. 2005, pp. 4110-4124.
Kikuchi N, "Intersymbol interference (ISI) Suppression Technique for Optical Binary and Multilevel Signal Generation", Journal of Lightwave Technology, IEEE Service Center, New York, NY US, vol. 25, No. 8, Aug. 1, 2007, pp. 2060-2068.

* cited by examiner

*Primary Examiner* — Joseph Martinez
(74) *Attorney, Agent, or Firm* — Antonelli, Terry, Stout & Kraus, LLP.

(57) ABSTRACT

The present invention relates to an optical modulator that generates quaternary amplitude modulated light without inter-symbol-interference by splitting input light into three optical paths, generating a continuous wave signal in a first optical path, generating binary phase modulated lights using a single drive MZ type optical phase modulator in second and third optical paths, and interfering them at in-phase and at field amplitude 1:a:b.

13 Claims, 29 Drawing Sheets

FIG. 3
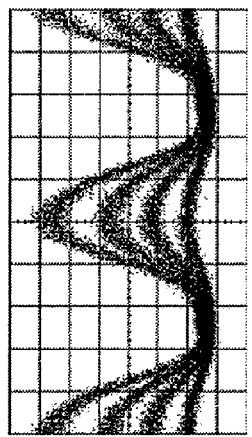
(C) EYE-PATTERN OF QUARTERNARY INTENSITY MODULATED LIGHT
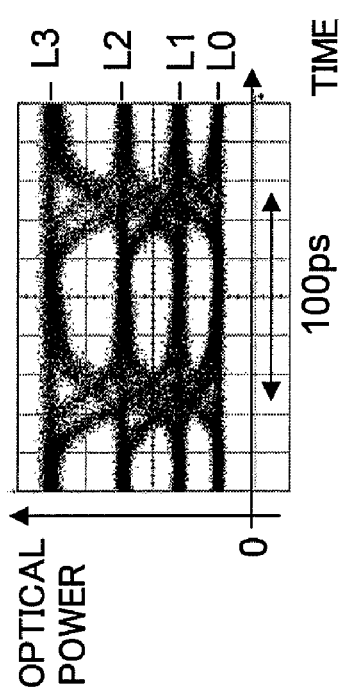
(A) EYE-PATTERN OF QUARTERNARY INTENSITY MODULATED LIGHT 111 (10G SYMBOL/SEC)
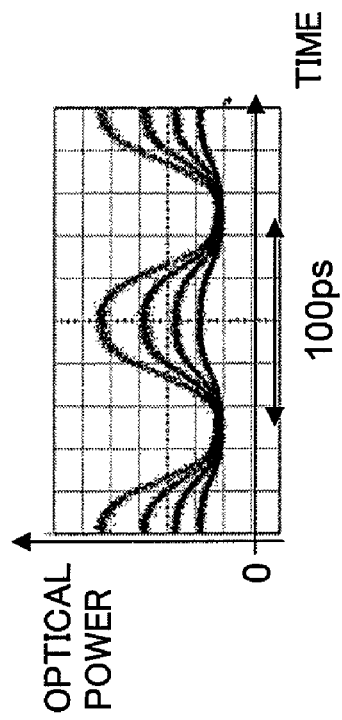
(B) WAVEFORM OF INTENSITY MODULATED LIGHT PULSE

X-CUT LN-MZ TYPE SINGLE DRIVE OPTICAL MODULATOR

FIG. 8
(A) WAVEFORM OF OPTICAL POWER
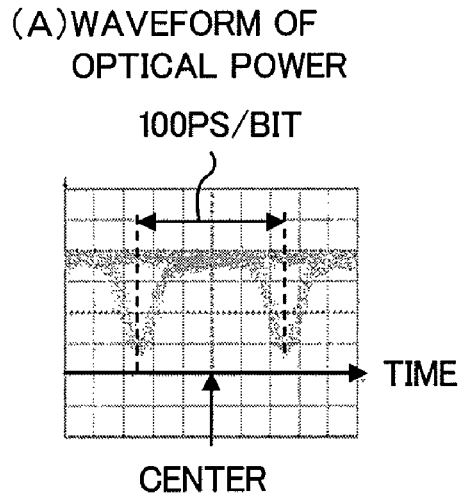
(B) SIGNAL CONSTELLATION
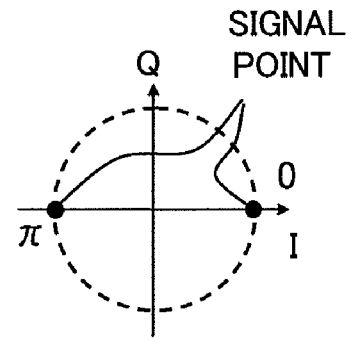
FIG. 9
QUADRATURE QUARTERNARY OPTICAL PHASE MODULATOR (PRIOR ART)
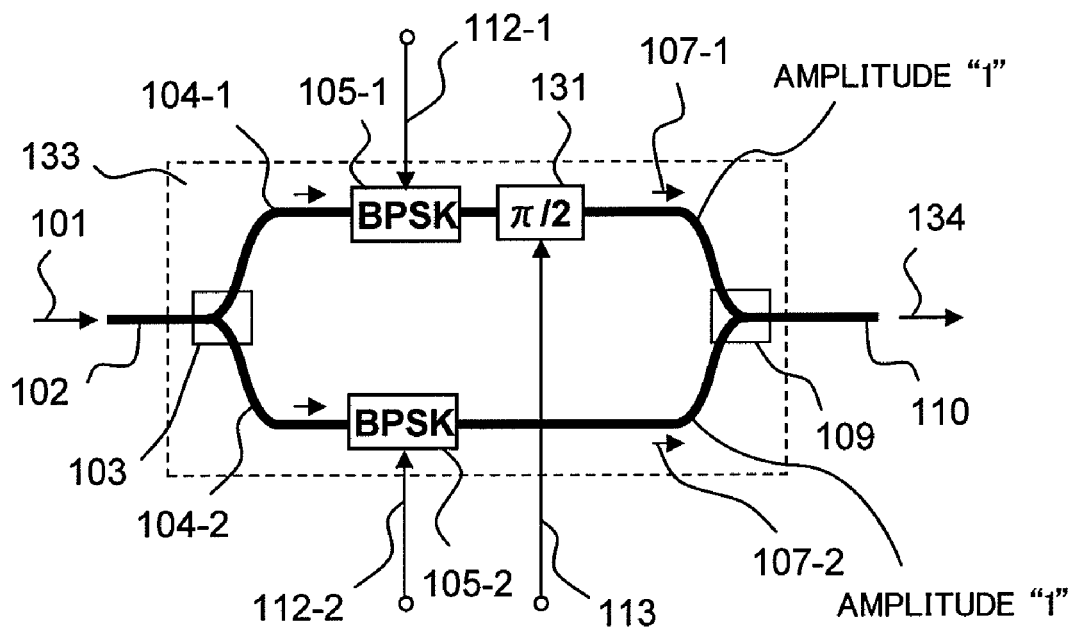

FIG. 10
(A) SIGNAL CONSTELLATION OF BINARY PHASE MODULATED LIGHT 107-1
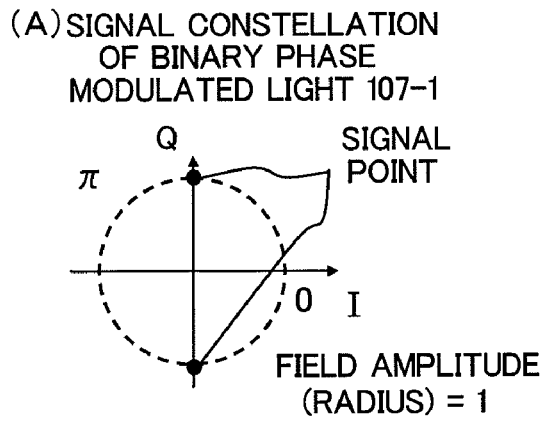
(B) SIGNAL CONSTELLATION OF QUADRATURE QUARTERNARY PHASE MODULATED LIGHT 133
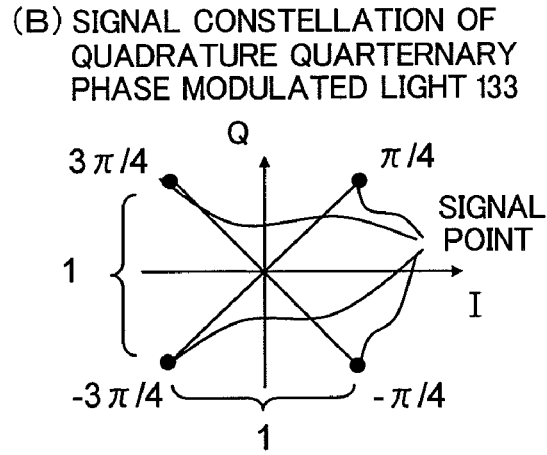
FIG. 11
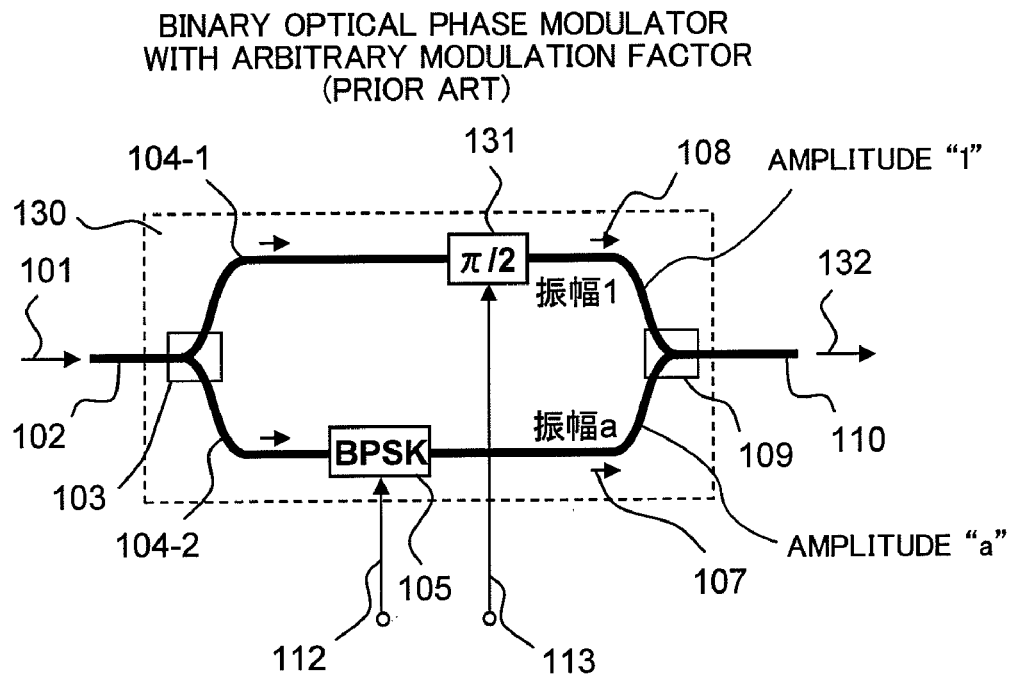

FIG. 12
(A) SIGNAL CONSTELLATION OF CONTINUOUS WAVE LIGHT 108
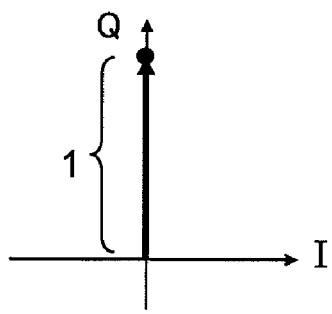
(B) SIGNAL CONSTELLATION OF BINARY PHASE MODULATED LIGHT 107
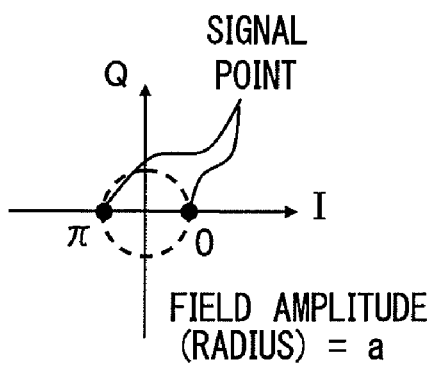
(C) SIGNAL CONSTELLATION
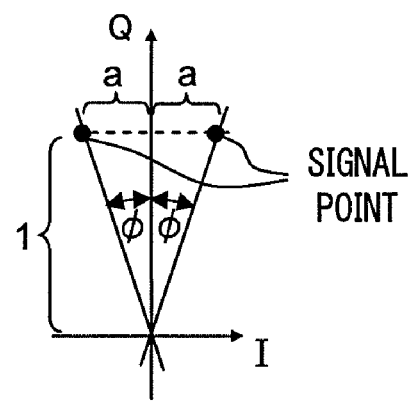

FIG. 16
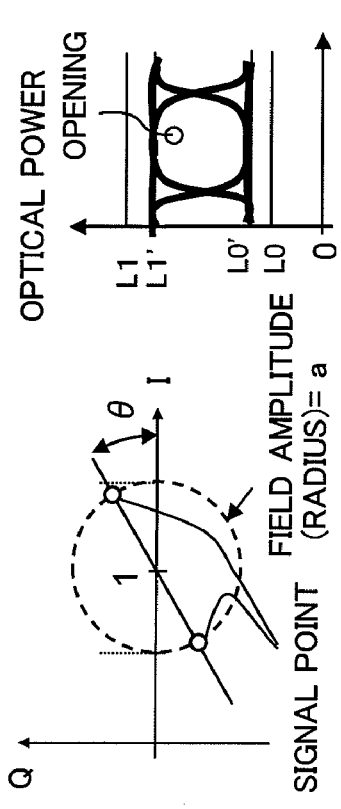
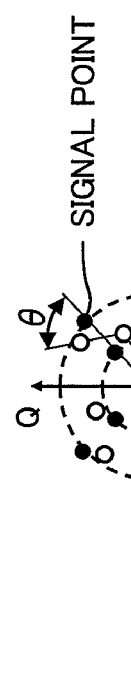
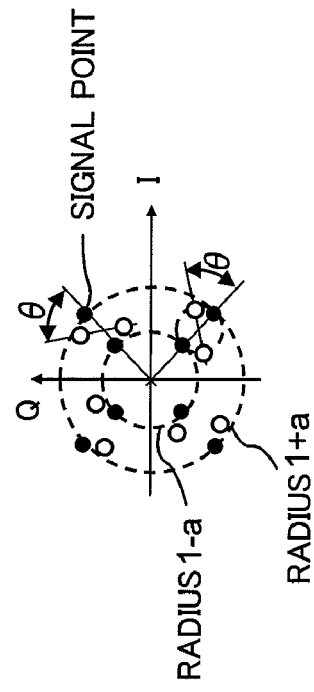
(A) SIGNAL CONSTELLATION OF OPTICAL SIGNAL 135
(B) SIGNAL CONSTELLATION AND WAVEFORM OF BINARY INTENSITY MODULATED LIGHT 111 (IN THE CASE OF OPTIMUM PHASE)
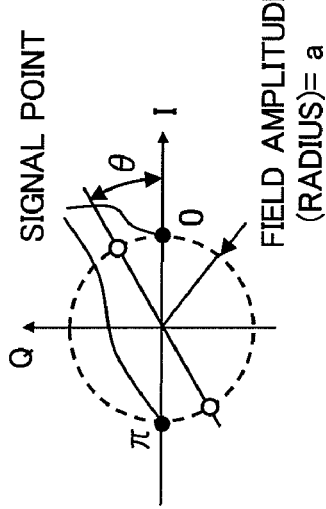
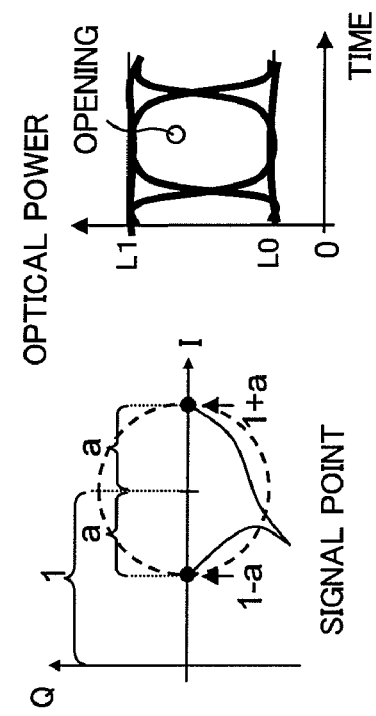
(C) SIGNAL CONSTELLATION AND WAVEFORM OF BINARY INTENSITY MODULATED LIGHT 111 (IN THE CASE OF OPTIMUM PHASE)
(D) SIGNAL CONSTELLATION 8-LEVEL INTENSITY-AND-PHASE MODULATED LIGHT 157

FIG.18
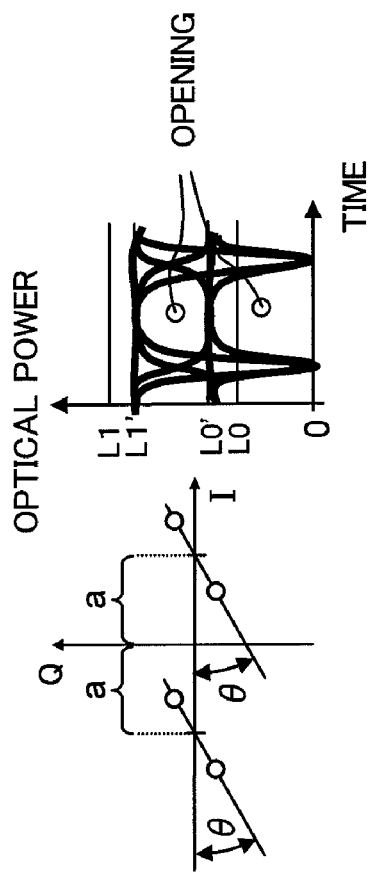
(A) SIGNAL CONSTELLATION OF BINARY PHASE MODULATED LIGHT 107-2 (IN THE CASE OF a > b)
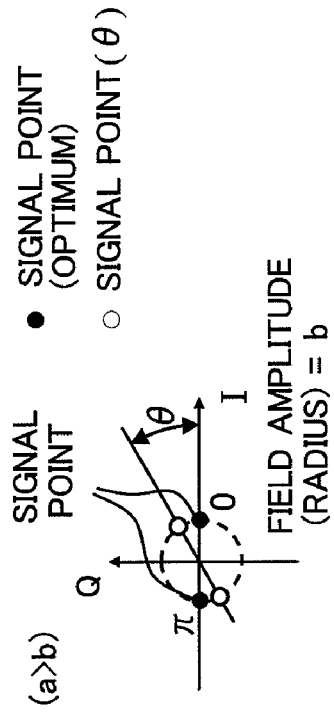
(B) SIGNAL CONSTELLATION AND WAVEFORM OF OUTPUT LIGHT 156
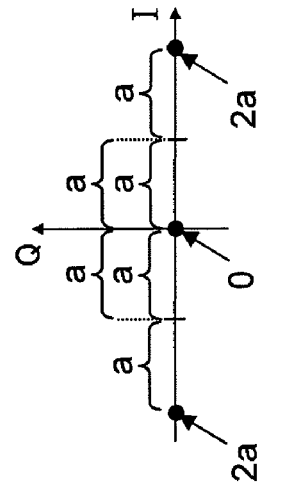
(C) SIGNAL CONSTELLATION AND WAVEFORM OF OUTPUT LIGHT 156
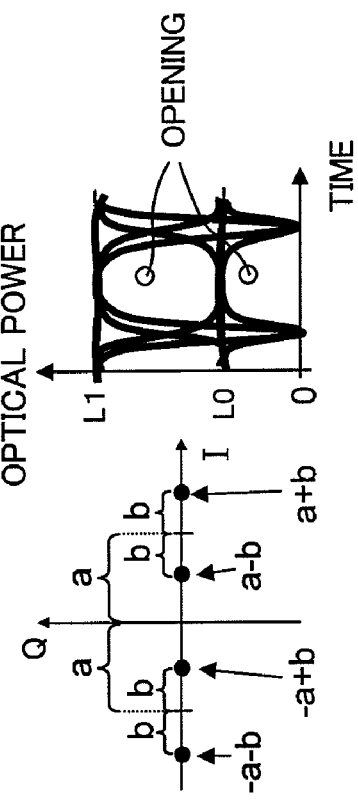
(D) SIGNAL CONSTELLATION OF OUTPUT LIGHT 156 (IN THE CASE OF a = b)

FIG. 20
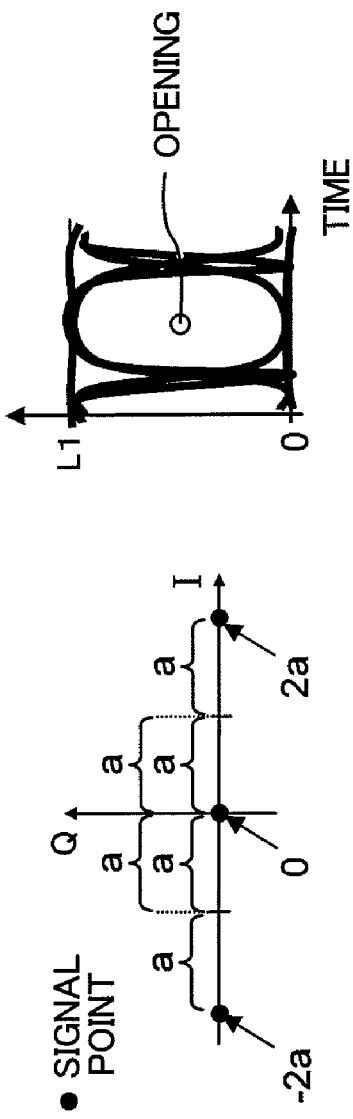
(A) SIGNAL CONSTELLATION AND WAVEFORM OF OUTPUT LIGHT 162
(IN THE CASE OF a = b)
(B) TRUTH TABLE OF DUOBINARY CODE
| D(n-1) | D(n) | DB(n) | D0(n) | D1(n) |
|---|---|---|---|---|
| 0 | 0 | 0 | 0 | 0 |
| 0 | 1 | 1 | 0 | 1 |
| 1 | 0 | 1 | 1 | 0 |
| 1 | 1 | 2 | 1 | 1 |
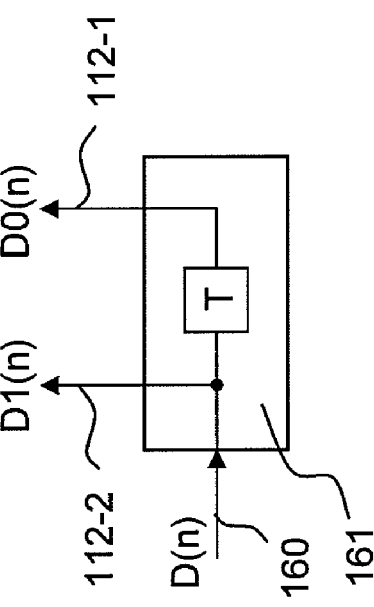
(C) DUOBINARY CODER (A) SIGNAL CONSTELLATION AND
WAVEFORM OF OUTPUT LIGHT 165
(IN THE CASE OF a = b = 0.5)

(B) TRUTH TABLE OF 3-LEVEL SIGNAL CODING

| T | D0 | D1 |
|---|----|----|
| 0 | 0  | 0  |
| 1 | 0  | 1  |
| 2 | 1  | 1  |

FIG. 23
(A) SIGNAL CONSTELLATION OF
MULTILEVEL AMPLITUDE-AND
-PHASE MODULATED LIGHT 156
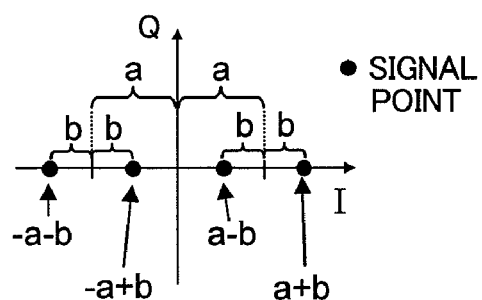
(B) SIGNAL CONSTELLATION OF
QUARTERNARY INTENSITY
MODULATED LIGHT 147
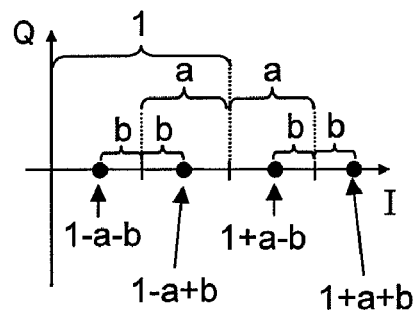
(C) TRUTH TABLE OF 4-LEVEL
GRAY CODING (a>b)
| T | D0 | D1 |
|---|---|---|
| 00 (1−a−b) | 0 | 0 |
| 01 (1−a+b) | 0 | 1 |
| 11 (1+a−b) | 1 | 0 |
| 10 (1+a+b) | 1 | 1 |

FIG. 25
(A) SIGNAL CONSTELLATION OF
CONTINUOUS WAVE LIGHT 151
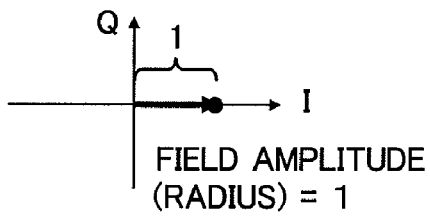
FIELD AMPLITUDE
(RADIUS) = 1
(B) SIGNAL CONSTELLATION OF
QUADRATURE QUARTERNARY
PHASE MODULATED LIGHT 134
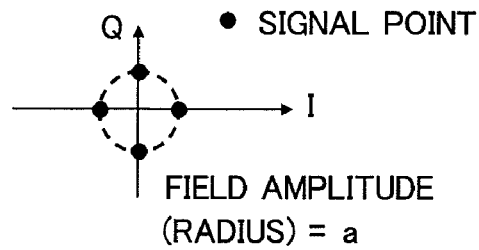
FIELD AMPLITUDE
(RADIUS) = a
(C) SIGNAL CONSTELLATION OF
QUARTERNARY AMPLITUDE-AND
-PHASE MODULATED LIGHT 172
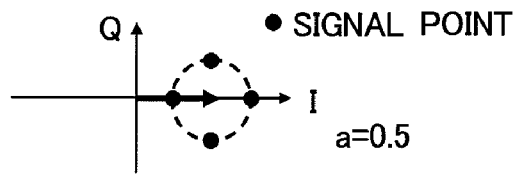
a=0.5
(D) SIGNAL CONSTELLATION OF
OUTPUT LIGHT 173
(IN THE CASE OF a=0.5, b=0.5)
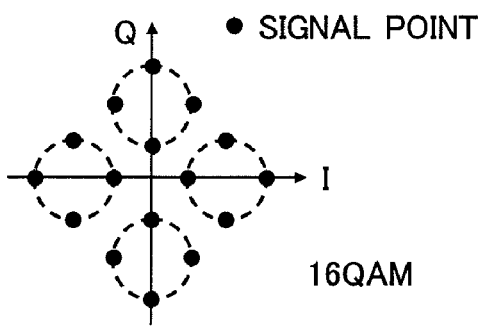
16QAM

FIG. 26
(A) SIGNAL CONSTELLATION OF
CONTINUOUS WAVE LIGHT 108
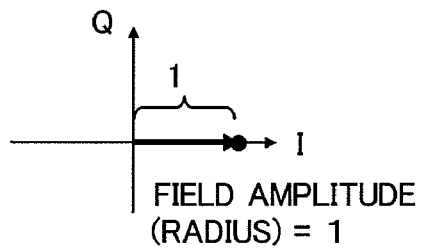
(B) SIGNAL CONSTELLATION OF
QUARTERNARY PHASE
MODULATED LIGHT 134
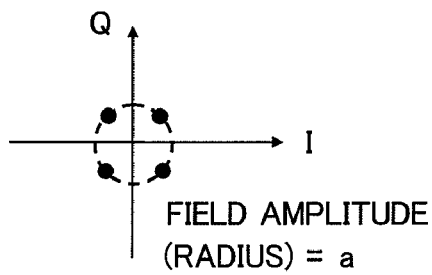
(C) SIGNAL CONSTELLATION OF
QUARTERNARY AMPLITUDE-AND
-PHASE MODULATED LIGHT 172
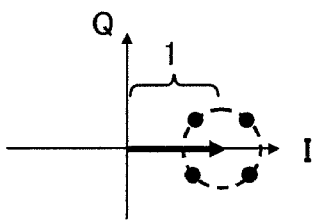
(D) SIGNAL CONSTELLATION OF
16QAM MODULATED LIGHT 173
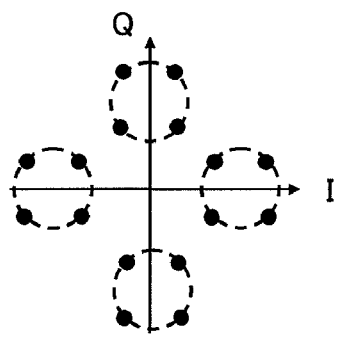

FIG. 28
(A) SIGNAL CONSTELLATION OF BPSK LIGHT
● SIGNAL POINT OF MODULATED LIGHT 107-1
○ SIGNAL POINT OF MODULATED LIGHT 107-2
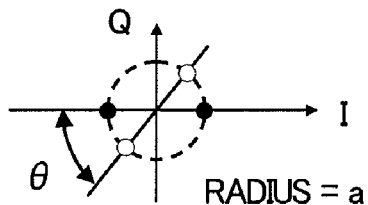
(B) SIGNAL CONSTELLATION OF QUARTERNARY AMPLITUDE-AND -PHASE MODULATED LIGHT 172
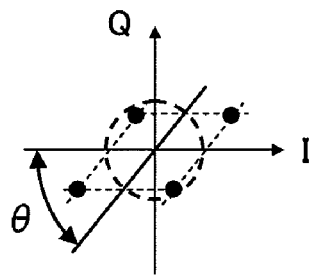
(C) SIGNAL CONSTELLATION OF 8-LEVEL AMPLITUDE-AND -PHASE MODULATED LIGHT 157
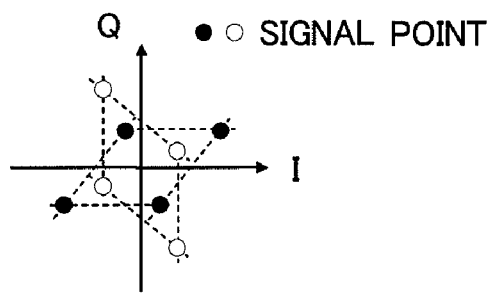

FIG. 30
(A) SIGNAL CONSTELLATION OF
    OUTPUT LIGHT 183
    ( IN THE CASE OF a = 0.5 )
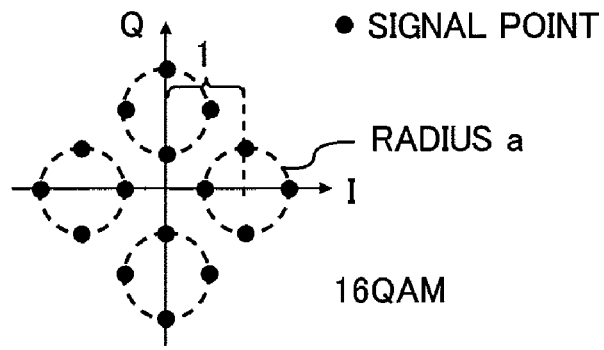
16QAM
(B) SIGNAL CONSTELLATION OF
    OUTPUT LIGHT 183
    ( IN THE CASE OF a = 1 )
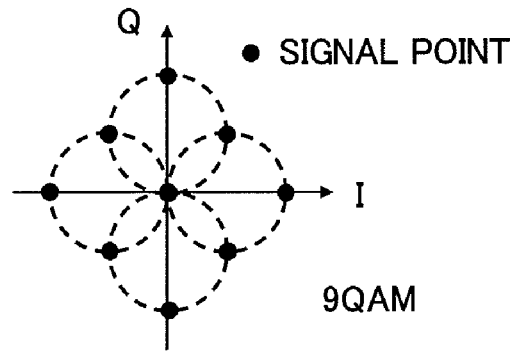
9QAM
(C) SIGNAL CONSTELLATION OF
    OUTPUT LIGHT 183
    ( IN THE CASE OF a = 0 )
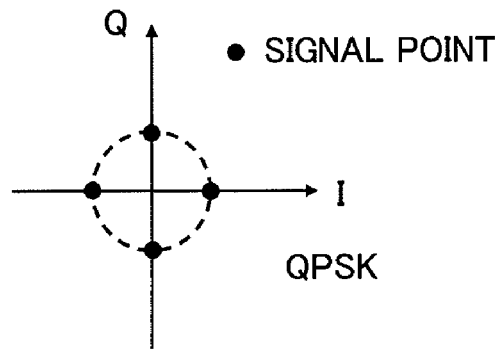
QPSK

US 7,978,390 B2

OPTICAL MODULATOR

TECHNICAL FIELD

The present invention relates to an optical modulator, and more particularly, to a multilevel optical modulator suitable for optical information transmission performed through an optical fiber.

BACKGROUND ART

Recently, with the increase in the number of WDM signals in wavelength-division multiplexing or in the modulating speed of an optical signal, transmission capacity, which is the amounts of information transmissible over one optical fiber, has also increased. However, it is considered that the transmission capacity reaches the limit at approximately 10 T(tera) bits/s. The reason is that a wavelength band usable to the optical transmission reaches a limit value defined by a wavelength band of an optical fiber amplifier (when summing C, L, and S bands, about 80 nm corresponds to 10 THz) and thus, there is no room to increase the number of signal wavelengths.

In order to further increase the transmission capacity of the optical fiber, there is a need to study a modulation format and increase efficiency of frequency usage. In the field of wireless radio communication, a multilevel modulation technology has been widely used since the 1960's, such that high-efficiency transmission, such high efficiency of frequency usage exceeding 10, can be achieved. The multilevel modulation is promising even in the optical signal transmission using the optical fiber and therefore, numerous studies thereon have been made up to now.

For example, a Quadrature Phase Shift Keying (QPSK) system that performs quaternary (4-level) phase modulation is proposed in "10 Gbits/s Optical Differential Quadrature Phase Shift Key (DQPSK) Transmission using GaAs/Al-GaAs Integration" OFC2002, paper PD-FD6, 2003 (Non-Patent Document 1). Further, the inventors propose 16-level amplitude-and-phase modulation combining quaternary amplitude modulation and quaternary phase modulation in "Proposal and Demonstration of 10-Gsymbol/sec 16-ary (40 Gbits/s) Optical Modulation/Demodulation Scheme", paper We3.4.5, ECOC 2004, 2004 (Non-Patent Document 2).

Various optical multilevel modulation have been studied as above, as a factor that disturbs the practical use of the multilevel modulation, there is an inter-symbol-interference between transmitting waveforms. Further, since a signal bit rate used for the optical fiber communication reaches 10 Gbits/s to 40 Gbits/s, a very high-speed multilevel optical modulation technology is required. The speed of the multilevel optical modulated signal is 100 to 1000 times a typical multilevel radio signal, and in a process for generating the multilevel optical modulated signals, the signal waveforms are remarkably degraded due to frequency responses of the optical modulator and RF portions and additive operation of a group of RF signals.

In order to help understand the present invention to be described later, the deterioration of the signal waveforms and the inter-symbol-interference caused in the process of generating the multilevel optical signals will be described with reference to FIGS. 4A to 4C.

FIG. 4(A) shows an eye-pattern of a waveform of a binary electrical signal of 10 Gbits/s to be used in generating multilevel signals. Even in the waveform of the simple digital signal such as a binary signal, when the signal bit rate is 10 Gbits/s or higher, it becomes difficult to obtain an ideal rectangular waveform. Since two levels above and below the waveform of the digital signal, that is, marks and spaces are degraded by the inter-symbol-interference (ISI), the waveform of the digital signal generally has certain width in an upper and lower direction as shown in FIG. 4A. As a result, it is known that a height of an eye-opening located at a central part of the waveform of the digital signal is reduced, leading to deterioration of receiver sensitivity and chromatic dispersion tolerance.

If the signal bit rate exceeds 10 Gbits/s, it becomes difficult to directly generate the multilevel signal. Accordingly, such a high-speed multilevel signal is generally generated by adding binary electrical digital signals having different amplitude values. For example, in the case of generating a high-speed quaternary digital signal, two sequences of binary digital signals having the same bit rate are generated independently and added at an amplitude ratio of 2:1 in a state where their bit timings are matched with each other.

For example, if a binary electrical signal having amplitude "2" shown in FIG. 4(A) and a binary electrical signal having amplitude "1" shown in FIG. 4(B) are added by using an RF signal divider, a quaternary electrical signal having four voltage levels arranged at regular intervals is generated, as shown in FIG. 4(C). In this case, when two sequences of RF signals are added, the inter-symbol-interference increases due to signal reflection caused in circuit components or undesired frequency response of circuit components, etc. As a result, the waveform of the multilevel signal (in this example, quaternary signal) is significantly degraded as shown in FIG. 4C.

On the other hand, in order to generate multilevel amplitude modulated light, it is necessary to perform the optical amplitude modulation by applying the above-mentioned multilevel electrical signal to the high-speed optical modulator. In general, voltage amplitude required for driving the optical modulator is 2 to 5 V; it is an extremely large amplitude value for the RF signal. Therefore, voltage amplification using a driver amplifier is required in driving the optical modulator. However, the multilevel waveform is largely degraded due to nonlinearity of the amplifier characteristics, limitations of output saturation, and frequency bandwidth, and peaking, etc.

A Mach-Zehnder (MZ) optical modulator having been widely used for the optical modulation can advantageously control the chirp of an optical phase involved in the optical modulation with high accuracy and realize good modulation characteristics (optical transmittance of driving voltage) in a wideband. However, the modulation characteristic of the MZ type optical modulator exhibits a sinusoidal wave with respect to the applied voltage as shown in a graph of FIG. 5.

In the simple binary amplitude modulation that is widely used for the high-speed optical fiber communication, it is normal to match the levels of the mark and the space of the electrical signal with a bottom and a peak of the modulation characteristic of the sinusoidal wave shown in FIG. 5. In this case, even when the voltage values of the mark level and the space level are fluctuated to some degree due to the inter-symbol-interference, it possible to obtain an extremely excellent output waveform because the fluctuation in the intensity of the optical signal is suppressed. This is because an inclination of the modulation characteristic with respect to the applied voltage becomes approximately 0 at both points of the bottom and the peak, which is known as a waveform rectifying effect of the MZ type optical modulator.

When the MZ type optical modulator is used for the quaternary optical amplitude modulation, as shown in FIG. 5, the quaternary electrical signal is made match the shoulder portions of the modulation/extinction characteristics of the sinusoidal wave so that different optical power is obtained in corresponding to four voltage levels of the quaternary electrical signal. At this time, the waveform rectifying effect of the above-mentioned MZ type optical modulator can be obtained by matching two voltage levels at both ends of the quaternary electrical signal with the peak and the bottom of the extinction characteristic, respectively. However, there is a problem that the inter-symbol-interference cannot be suppressed because the waveform rectifying effect is not achieved in two voltage levels at a center of the quaternary electrical signal.

In the high-efficiency optical multilevel signal transmission, a multilevel amplitude-and-phase modulation, which applies the phase modulation simultaneously with the amplitude modulation to the optical signal, has been studied as described in the Non-Patent document 2. In the optical amplitude modulation used herein, in order to utilize the optical phase information at any time, it is necessary to intentionally set the extinction ratio of the optical signal to be lower so that the optical level L0 having the minimum amplitude becomes larger than 0. In this case, as shown in FIG. 5, even for the optical level L0 having the weakest power, the waveform rectifying effect cannot be obtained and the large waveform deterioration occurs in the quaternary waveform of the output light. As such, the occurrence of the inter-symbol-interference becomes a big problem in the generation of the optical amplitude modulation.

On the other hand, in the field of the optical phase modulation, a modulator that suppresses the inter-symbol-interference is proposed. The most basic configuration is a binary optical phase modulator with a modulation factor π that uses a single drive chirp-less MZ type optical modulator as shown in FIG. 6.

In the single drive chirp-less MZ type optical modulator 120 shown in FIG. 6, input light 101 of a continuous wave (CW), which is input from an input optical path 102, propagates through a waveguide structure in the modulator and is divided into two optical waveguides 127-1 and 127-2 by an optical splitter 103. Two lights passing through these optical waveguides are combined by an optical coupler 109 and output to an output optical path 110 as output light 126 having been subjected to the binary phase modulation of a modulation factor π.

A traveling-wave electrode 121 for modulation signal is disposed between two waveguides 127-1 and 127-2 on a base plate of the modulator. A modulation signal input terminal 122 is connected to one terminal of the traveling-wave electrode 121 and a terminating resistance 125 is connected to the other terminal thereof. A high-speed binary electrical digital signal applied to the modulation signal input terminal 122 is absorbed by the terminating resistance 125 after propagating along the electrode 121. During the binary electrical digital signal is propagating along the traveling-wave electrode 121, the binary electrical digital signal generates an electric field which causes an electro-optic effect for two waveguides 127-1 and 127-2. As a result, phase difference occurs between two waveguides and the transmission strength of the optical signal changes in the sinusoidal wave manner according to signal voltage V applied to the traveling-wave electrode 121 as shown in FIG. 7.

In the above-mentioned single drive MZ type optical modulator, it is known that the phase chirp involved in the power change of the optical waveform can be disregarded (chirp-less) because the phase difference occurring in two waveguides 127-1 and 127-2 is an anti-phase to each other, and that the phase of the output optical signal is temporarily switched by π at a point where the optical signal power is 0 as shown in FIG. 7. Further, the phase of the above-mentioned sinusoidal wave can be shifted into any voltage position by a bias voltage applied to a biasing electrode 123 via a terminal 124.

When the above-mentioned single drive chirp-less MZ modulator is used in the binary optical phase modulation, as shown in FIG. 7, the average level L0 of the space and the average level L1 of the mark of the binary electrical digital signal are made match with the two peaks of the sinusoidal wave optical transmission characteristic, by matching the amplitude of the binary electrical digital signal applied to the traveling-wave electrode 121 with the sinusoidal wave period (2Vπ) of the optical transmission characteristic and by adjusting the bias voltage. In this case, the phase of the optical signal is switched to 0 when the binary electrical digital signal is space and to π when the binary electrical digital signal is the mark. Since both voltages of the mark and space are matched with the peak portion of the MZ type modulator transmission characteristic, the waveform rectifying effect is obtained with respect to the fluctuation of the voltage waveform and it possible to suppress the fluctuation of the optical power.

FIG. 8(A) shows the optical power waveform obtained through the experiment in the binary optical phase modulator using the single drive chirp-less MZ type optical modulator. It can be appreciated from the waveform that the fluctuation of the optical power occurs only in boundary portions of each bit, the power variation is suppressed in the vicinity of the center of the waveform, and the optical power is constant.

FIG. 8(B) shows signal constellation of the optical signal in the above-mentioned binary optical phase modulator. In this constellation, the complex optical field at a central time of each optical signal bit is plotted on a complex plane. The distance (radius) from the origin indicates the field amplitude and an angle from the I-axis indicates the phase of the optical field. As the amplitude on the I-axis is constant and signal points are located at two points of a phase 0 and a phase π, this binary optical phase modulator can generate approximately ideal phase modulated light having little extension in a radial direction and an angular direction and almost no inter-symbol-interference.

Further, it is known that above-mentioned binary optical phase modulation of the modulation factor π can be realized, almost in the same manner, by a dual drive MZ type modulator having individual modulation electrodes in two optical waveguides in the modulator. In this case, the modulating operation may be performed at the same operation points by applying binary digital signals having the same amplitude (Vπ) and anti-phase to each other to two modulation electrodes at the same timing.

FIG. 9 shows a four-level quadrature optical phase modulator 133 in the prior art that is configured using the above-mentioned binary phase modulator. As this kind of quadrature phase modulator, for example, a modulator using a semiconductor MZ type optical modulator is disclosed in Non-Patent Document 1.

Input light 101 of continuous wave input from the input optical path 102 is split into two optical paths 104-1 and 104-2 by the optical splitter 103. The optical paths 104-1 and 104-2 are formed by optical waveguides. Above-mentioned single drive MZ type binary optical phase modulators 105-1 and 105-2 are located on both the optical paths, and binary electrical digital signals having the same bit rate are independently supplied to modulation signal input terminals 112-1 and 112-2. These binary electrical digital signals are adjusted to have signal delay amounts so that the bit timings are matched with each other. By applying the above-mentioned binary electric digital signals, binary phase modulation of modulation factor π is applied to the light passing through the optical paths 104-1 and 104-2, respectively.

In one optical path 104-1, a π/2 optical phase shifter 131 is inserted at a rear of the binary optical phase modulator 105-1 so that the phase of the binary phase modulated light is rotated by π/2. As a result, the signal constellation of the binary phase modulated light 107-1 passing through the optical path 104-1 becomes in a state as shown in FIG. 10(A), and the signal constellation of the binary phase modulated light 107-2 passing through the other optical path 104-2 becomes in a state as shown in FIG. 8(B).

These binary phase modulated lights are input to an optical coupler 109 in the same optical power and interfere with each other. Since the phase of the binary phase modulated light is in the state of any of two signal points shown in FIG. 10(A) or FIG. 8(B) momentary, the signal constellation of an output light 134 from the optical coupler 109 includes, as shown in FIG. 10(B), signal points obtained by performing vector synthesis on signal points or phase points of FIG. 10 (A) and signal points of FIG. 8 (B). The signal points of the output light 134 are four points of π/4, 3 π/4, −3 π/4, and −π/4, which are deviated by 90° to each other, and the output light 134 is quadrature quaternary phase modulated light.

Since the quadrature quaternary phase modulator 133 performs vector synthesis on the two binary phase modulated lights having no signal point extension (inter-symbol-interference), as far as the synthesis angle is stable, the output light 134 becomes ideal quaternary phase modulated light having no inter-symbol-interference.

FIG. 11 shows the configuration of binary optical phase modulator 130 having an arbitrary modulation factor shown in Japanese Patent Publication No. 2004-348112 (U.S. Pat. No. 6,798,557: Patent Document 1).

Although the binary optical phase modulator 130 shown here has approximately the same structure as the quadrature quaternary phase modulator 133 shown in FIG. 9, there is no optical modulator in the optical path 104-2 having been provided with a π/2 optical phase shifter 131. Therefore, the binary phase modulated light 107 and the continuous wave light (CW light) 108 are combined by the optical coupler 109. The binary phase modulated light 107 and the continuous wave light 108 are not the same in terms of power and their amplitude ratio is intentionally set 1:a.

FIG. 12(A) shows the signal constellation of the continuous wave light 108 having amplitude of "1" and FIG. 12(B) shows the signal constellation of the binary phase modulated light 107. As a result of π/2 phase shift, the continuous wave light 108 has an apex at points (0, 1) on a Q-axis. The signal point of the binary phase modulated light 107 is any one of (−a, 0) and (a, 0). Therefore, the signal point of the output light 132 obtained by interfering the two optical signals by the optical coupler 109 is any one of (−a, 1) and (a, 1) as shown in FIG. 12(C). It can be appreciated that because these two points have the same distance from the origin point to each other and the phase angles thereof are changed by ±φ=arctan (a), it becomes phase modulated light having modulation amount 2φ.

The binary optical phase modulator 130 can optionally set the modulation phase angle φ by adjusting the ratio "a" of the two optical signals 107 and 108 and can suppress the occurrence of inter-symbol-interference in both the phase direction and the amplitude direction, likewise the above-mentioned quadrature modulator. Patent Document 1 discloses that multilevel phase modulators such as 8-level, 16-level and the like can be configured by connecting phase modulators having phase modulation amount optionally set to π, π/2, and π/4, in a multi-stage tandem connection having a binary branch construction.

Non-Patent Document 1:

R. A. Griffin, et. al., "10 Gbits/s Optical Differential Quadrature Phase Shift Key (DQPSK) Transmission using GaAs/AlGaAs Integration" OFC2002, paper PD-FD6, 2003

Non-Patent Document 2:

Kenro Sekine, Nobuhiko Kikuchi, Shinya Sasaki, Shigenori Hayase and Chie Hasegawa, "Proposal and Demonstration of 10-Gsymbol/sec 16-ary (40 Gbits/s) Optical Modulation/Demodulation Scheme", paper We3.4.5, ECOC 2004, 2004.

Patent Document 1:

Japanese Patent Publication No. 2004-348112

(U.S. Pat. No. 6,798,557: Sep. 28, 2004 "Direct Optical N-State Phase Shift Keying" Appl. No. 443328, Filed: May 22, 2003)

Patent Document 2:

Japanese Patent Publication No. 2002-328347

DISCLOSURE OF THE INVENTION

Problems to be Solved by the Invention

As described above, waveform generation technology that can almost completely suppress the inter-symbol-interference is known for the phase modulation. However, binary and multilevel optical modulation technology for amplitude modulation or simultaneous amplitude and phase modulation has not been reported yet. For example, Patent Document 1 does not describe about the method of generating the waveform of intensity modulation at all.

On the other hand, the reduction of waveform distortion in a multilevel amplitude modulation is important. For example, Japanese Patent Publication No. 2002-328347 discloses the method of generating quaternary optical signal by applying binary electrical signals having different modulation factor from each other to two electrodes in the MZ modulator. Although this method has an advantage such that the waveform deterioration which occurs at the time of signal adding can be suppressed well as compared with the case where two electrical signals are directly added, it cannot suppress the waveform distortion in the original binary electrical signals because this method uses the inclined portion of the extinction characteristic of the MZ modulator. Moreover, there is a problem of a large chirp in the phase direction, which is caused by the independent modulating operation at two electrodes.

Further, in the binary amplitude modulation, it has been understood that power waveform with suppressed inter-symbol-interference can be simply generated by matching the mark and the space of binary electrical digital signal with the peak and the bottom of modulation characteristic of the MZ modulator, which exhibits in a sinusoidal wave form. However, in the binary optical modulation for use in the general multilevel optical amplitude-and-phase modulation, since the optical power cannot be set to 0 at the time of transmitting the space of the digital signal by the intensity modulation, the space level cannot match the bottom of the modulation characteristic, and there is a problem such that the waveform rectifying effect cannot be obtained in the space portion.

Therefore, a first object of the present invention is to provide an optical modulator capable of suppressing the occurrence of inter-symbol-interference and generating binary or multilevel amplitude modulated light having a signal waveform with no distortion in both the amplitude and phase.

A second object of the present invention is to suppress the occurrence of the inter-symbol-interference even in optical multilevel amplitude-and-phase modulation.

The maximum value of the number of levels in the multilevel optical modulation according to the prior art is 16-level amplitude-and-phase modulation that has been reported in the Non-Patent Document 2. In the optical modulation of a large number of signal levels, since the inter-symbol-interference that occurs between the amplitude and the phase at the time of the modulation becomes an obstacle and transmission characteristics such as the receiving sensitivity or the chromatic dispersion tolerance are limited, it is difficult to perform optical modulation having 16-level or more of the number of signal levels.

A third object of the present invention is to provide a multilevel optical modulator capable of increasing the number of signal levels, changing the number of signal levels flexibly if necessary, and transmitting information efficiently.

In optical multilevel amplitude-and-phase modulation, a method of arranging phase points of an optical signal on a concentric circle or on an equi-spacing grid has been known. However, a realistic method of generating optical waveform having a large number of signal levels was scarcely discussed. A quadrature synthesizing that performs vector synthesis on multilevel signals in a final stage, as used in wireless communication, is theoretically applicable to the optical waveform generation. However, when this quadrature synthesis method is applied to the optical signal modulation, it is required to configure an interference system including a complicated multilevel optical modulator and difficulty in the miniaturization of device size becomes a problem.

Means for Solving the Problems

The optical modulator according to the prior art having been described with reference to FIGS. 9 and 11 generates binary or quaternary phase modulated light by interfering continuous wave light and binary phase modulated light passed through a phase modulator (BPSK) or two binary phase modulated lights passed through phase modulators and shifted in phase by $\pi/2$ to each other.

The present invention makes it possible to generate amplitude modulated light or multilevel amplitude-and-phase modulated light which is modulated in both amplitude and phase and has ternary or more signal levels by using a phase modulator. The present invention is characterized by interfering output light from a plurality of optical paths, at least one of which includes the phase modulator, at in-phase or any phase angles other than $\pm\pi/2$.

In more specific, an optical modulator according to the present invention comprises: an input optical path; an optical splitter for splitting optical signal input from the input optical path into N optical paths (N is an integer of 2 or more); M optical phase modulators of K-level arranged in N−1 or less of the N optical paths (M is an integer of N−1 or more); and an optical coupler for interfering output light from the N optical paths with each other in the same polarization state to send out interfered light to an output optical path, wherein amplitude modulated light having amplitude values, the number of which is K to the M-th power or less, or multilevel amplitude-and-phase modulated light having been modulated in both amplitude and phase and having signal points, the number of which is K to the M-th power or less, is output to said output optical path, by interfering output light from at least two of the optical paths at the same phase or any phase angles other than $\pm\pi/2$.

Further, according to the present invention, an optical modulator for generating a modulated optical signal to an output optical path by splitting input light from an input optical path into N optical paths (N is an integer of 2 or more) and interfering output light from the optical paths with each other, includes a binary optical phase modulator in at least one of the N optical path, and multilevel amplitude modulation of binary or more levels or multilevel amplitude-and-phase modulation of ternary or more levels modulated in both amplitude and phase is applied to the input light to the input optical path, by interfering output light from at least two of the optical paths including the optical path having the optical phase modulator at the same phase or any phase angles other than $\pm\pi/2$.

According to the present invention, an optical amplitude modulator or an optical amplitude-and-phase modulator can be configured using a specific type of modulator, for example, a Mach-Zehnder type binary optical phase modulator as one of components. Further, by using as a phase modulator, a binary phase modulator of modulation factor $\pi$, a binary phase modulator of arbitrary modulation factor or a quadrature quaternary phase modulator, each using a modulator not generating inter-symbol-interference at the time of modulation such as, for example, a single drive MZ modulator or a dual drive MZ modulator, it is able to suppress almost completely the inter-symbol-interference in the multilevel amplitude modulated light or the multilevel amplitude-and-phase modulated light generated by performing vector synthesis on the optical signal generated by the modulator.

In the case where a single drive chirp-less Mach-Zehnder type binary optical modulator whose $\pi$ modulation voltage is $V\pi$ is used as the optical phase modulator, for example, a binary high-speed electrical digital signal, which has approximately $2V\pi$ of amplitude and whose average level of marks and average level of spaces coincide with two adjacent voltage points at which the optical phase modulator outputs the maximum optical power, is input to the optical phase modulator.

In the case where a dual drive Mach-Zehnder type optical modulator whose $\pi$ modulation voltage is $V\pi$ is used as the optical phase modulator, for example, two sequences of binary high-speed electrical digital signals inverted to each other and having approximately $V\pi$ of amplitude are input to the optical phase modulator. In this case, at the time of transmitting a mark and a space, operating points of the optical phase modulator are made coincide with two adjacent voltage points at which the Mach-Zehnder type optical phase modulator outputs the maximum optical power.

Another feature of the present invention resides in a configuration having a second modulator connected in tandem to the output optical path of the above-mentioned optical modulator. With this configuration, as will be apparent from embodiments described later, it is easy to generate the optical signal having complicated signal constellation such as a 16QAM signal. The optical modulator of the present invention may be combined with another optical modulator to which the present invention is applied.

Another feature of the present invention resides in that an optical phase adjuster is arranged in at least one of N optical paths into which the input light is split in order to adjust a phase difference from the output light of specific one of the other optical paths, and a variable optical attenuator for adjusting the amplitude of the optical signal is arranged in at least the optical path in which optical phase modulator is arranged. The amplitude opening value and signal constellation in the output optical waveform of the optical modulator can be changed by changing the field amplitude ratio and phase difference of the combined optical signal. In this case, by appropriately setting the amplitude ratio so that a pair of signal points overlap with each other in the signal constellation, it is able to intentionally generate a multilevel optical signal having arbitrary number of signal levels which is not lager than M to the N power (N is the number of M-level phase modulators) or an optical partial response signal.

In the above-mentioned configuration, for example, in the case where the second optical phase modulator is connected in tandem to the output optical path, the number of signal levels and the signal constellation of the modulated light output from the second optical phase modulator can be changed by controlling the optical phase adjuster and the variable optical attenuator.

When it is desired to combine the optical signal output from a plurality of optical paths at in-phase, occurrence of phase deviation causes deterioration of waveform. This problem can be solved by automatically controlling the phase of optical signal so that the amplitude modulated component is maximize in the combined output light, as will be described in detail in the embodiments.

Effects of the Invention

With the present invention, amplitude modulated light or multilevel amplitude-and-phase modulated light having three or more of multilevel which is modulated in both the amplitude and phase can be generated by using the phase modulator, by interfering the output light from a plurality of optical paths at in-phase or any phase angle other than $\pm\pi/2$. Further, by suppressing the inter-symbol-interference in an amplitude direction in the multilevel optical amplitude modulation, even when waveform deterioration occurs in the binary electrical signal, a multilevel optical signal having small waveform deterioration can be generated. Since the eye-opening in the waveform of the multilevel optical signal can be expanded, it is able to transmit information efficiently and to improve the optical signal receiving sensitivity on the receiving unit side significantly.

BEST MODES FOR CARRYING OUT THE INVENTION

Embodiments of the present invention will be described below with reference to the accompanying drawings.

First Embodiment

FIG. 1 shows a configuration of a quaternary optical amplitude modulator 100 as the first embodiment of the present invention;

Input light 101 supplied from an input optical path 102 is split into the first optical path 104-1, the second optical path 104-2, and the third optical path 104-3 by an optical splitter 103. Among these optical paths, in the second optical paths 104-2 and the third optical paths 104-3, single drive MZ type binary optical phase modulators 105-1 and 105-2 are arranged, respectively, and in the first optical path 104-1 and the third optical path 104-3, optical phase adjusters 106-1 and 106-2 are arranged, respectively.

To the modulated signal input terminals 112-1 and 112-2 of the binary optical phase modulators 105-1 and 105-2, individual binary electric digital signals are supplied, respectively. These electrical signals have the same bit rate with each other and respective signal delay amount are adjusted so that the bit timings are matched with each other. As a result, binary phase modulation of modulation factor $\pi$ is applied to the light passing through the second optical path 104-2 and the third optical path 104-3, respectively.

To the optical phase adjusters 106-1 and 106-2, bias signals are applied from the outside through bias terminals 113-1 and 113-2, respectively, thereby to adjust the phase state of optical signal output from each optical path. In this embodiment, respective optical signal passing through the optical paths 104-1, 104-2, and 104-3, that is, continuous wave light 108 and binary phase modulated signal 107-1 and 107-2 are adjusted by the bias signals so that they are completely matched in phase (phase difference is 0) with each other.

By mutually interfering the optical signals 108, 107-1, and 107-2 in the state where the phases are matched, by an optical coupler 109, it is able to cause quaternary amplitude modulation in output light 111 to be output to an output optical path 110. At this time, field amplitude ratio of the optical signals 108, 107-1, and 107-2 is "1:a:b". Since the instant power of each optical signal is a square of the field amplitude, the ratio of the instant power is "1:a^2=b^2".

A generation principle of the quaternary optical amplitude modulation in the above-mentioned quaternary optical amplitude modulator 100 will be described with reference to FIG. 2.

FIGS. 2(A), 2(B), and 2(C) show the signal constellations of the continuous wave light 108, the binary phase modulated light 107-1, and the binary phase modulated light 107-2, respectively. The phases of these optical signals are adjusted so that respective optical phases are matched with each other. When making a reference phase as I-axis, the signal point of the continuous wave light 108 has a coordinate (1, 0) as shown in FIG. 2(A), the signal point of the binary phase modulated light 107-1 becomes (−a, 0) or (a, 0) as shown in FIG. 2(B), and the signal point of the binary phase modulated light 107-2 becomes (−b, 0) or (b, 0) as shown in FIG. 2(C). Therefore, the signal constellation of the output light 111 obtained by combining (interfering) three optical signals becomes following four points: (1−a−b, 0), (1−a+b, 0), (1+a−b, 0), or (1+a+b, 0).

Here, if the amplitude ratios "a" and "b" are in a relation 0<b<a<1, the signal constellation of the output light 111 has four points having different distances (field amplitude) from an origin point on I-axis as shown by a black circle in FIG. 2(D) and the output optical signal 111 becomes quaternary amplitude modulated light having four different intensity levels $(1-a-b)^2$, $(1-a+b)^2$, $(1+a-b)^2$, and $(1+a+b)^2$.

Because the optical signal input to the optical coupler 109 includes the continuous wave light 108 and the ideal binary phase modulated light 107-1 and 107-2 each having no inter-symbol-interference (no expansion of signal point), the output optical signal (quaternary amplitude modulated light) 111 obtained by vector-adding these optical signals also becomes an ideal waveform having suppressed inter-symbol-interference. Further, since all signal points are arranged on I-axis, the phase fluctuation does not occur in the output optical signal 111 at the time of modulation.

According to the first embodiment, since the signal level of the quaternary amplitude modulated light output from the modulator 100 is determined by the field amplitude ratio "a" and "b" as described above, it is able to obtain an optical signal having a desired level ratio by appropriately setting their intensity. For example, if "a"=⅔ and "b"=⅓, the four intensity levels of the output signal becomes 0:2/3:4/3:2=0:1:2:3 in an ascending order in terms of the field ratio, so that the interval of the optical field of each level can be constant, provided that the optical intensity of the lowest level (field amplitude is 1−a−b) is 0.

When the field is arranged at regular intervals, the more the level rises, the more the interval of the optical power ratio of level extends according to a square-law, in such a manner as 0:1:4:9. In an optical transmission system using an optical amplifier, noise light from the optical amplifier affects as a factor of receiver sensitivity limitation. Therefore, by arranging the optical power level according to a square-law as above, the receiver sensitivity becomes the most ideal.

Since quaternary intensity modulated light obtained with this embodiment is chirp-less, it is able to generate multilevel amplitude-and-phase modulated light by using the embodiment to optical phase modulation. In this case, field amplitude ratio is set, for example, a=0.4 and b=0.2 in order to prevent the optical power of the lowest level from being 0. At this time, the four levels of the output optical signal become 0.4:0.8:1.2:1.6=1:2:3:4 in a ascending order in terms of the field ratio, wherein the square-law described above is realized including the lowest level. In this case, since the receiver characteristic is degraded when the lower eye-opening becomes too small, it is preferable in an actual application to perform level setting in such a manner that the optical power level may be about middle between the equidistance arrangement and the square-law arrangement.

FIG. 3 shows the signal waveform of the quaternary intensity modulated light generated by the experiment according to the modulation method of the embodiment.

Similarly to FIG. 1, an experiment system is configured to split the optical signal into three paths, arrange single drive MZ type optical modulators in the second and third optical paths, and optically re-couple the continuous wave light and two binary phase modulated light each passing through the single drive MZ type optical modulator. These components are coupled by the optical fiber having approximately the same length. The bit rate of data signal applied to the single drive MZ type optical modulator is 10 G bits/s and the amplitude of the data signal is set to approximately 90% of the ideal amplitude value $2V\pi$. Further, optical attenuators are inserted in the three optical paths coupled with the interferometer, respectively, so that power ratio of three optical signals 108, 107-1 and 107-2 becomes approximately "1:−11.4 dB:−16.5 dB" and field ratio becomes approximately "1:0.26:0.15". The power ratio of each level of the quaternary optical signal becomes L0:L1:L2:L3=1:2.2:3.53:5.66 in terms of the calculation.

FIG. 3(A) shows an eye-pattern of the quaternary intensity modulated light that is actually generated. Although each level slightly extends in the first half etc., of bit due to the insufficiency of the voltage amplitude, it can be confirmed that an excellent eye-opening having approximately the same thickness is obtained at every level and the suppressing effect of the inter-symbol-interference is achieved.

FIG. 3(B) shows the optical waveform obtained by pulsing the quaternary intensity modulated light and FIG. 3(C) shows the quaternary optical waveform generated by combining the electrical signals according to the prior art. In the latter, the width of each optical power level increases, and the width of the eye-opening reduces, because of the waveform deterioration by the inter-symbol-interference. In the former, however, it can be confirmed that the width of each level is sufficiently narrowed as the inter-symbol-interference is suppressed and extremely excellent eye-opening is obtained. As such, according to this embodiment, it is able to generate ideal optical intensity modulation waveform with suppressed inter-symbol-interference.

In order to interfere the optical signals from respective optical paths in coherent and also prevent optical phase noise from converting into optical amplitude noise, the first embodiment needs, in implementation, to keep the difference among the lengths of optical paths as short as possible. Although it depends on a line width of laser light source, the difference has to be kept within several 10 cm generally. Further, it is necessary to keep the polarization states of the optical signals constant in order to efficiently interfere three optical signals. These conditions can be realized by using a polarization-maintaining optical fiber interferometer. In order to further miniaturize the device, it is preferable to adopt a configuration using an interferometer using bulk-space optics and integrating a plurality of optical components so as to couple them with waveguides.

The configuration of the quaternary optical amplitude modulator 100 shown in FIG. 1 is an optical circuitry with approximately the same scale as the quadrature quaternary phase modulator shown in FIG. 9 which is already integrated on an LN crystal or a semiconductor chip and has no problem in realization of product. By structuring in the form of small size integrated circuit, it is able to realize an optical amplitude modulator which makes the phase deviation of the interferometer due to the change in temperature, etc., small and operates stably. This advantage is common to an optical multilevel amplitude-and-phase modulator according to the present invention, which will be described later.

In FIG. 1, the phase adjuster 106 (106-1 and 106-2) is a unit for finely adjusting the phase of the optical signal within a level of wavelength and the function thereof can be realized by various methods such as adopting an optical phase modulator using an electro-optic effect or a Shtark effect, etc., forming a high reflective index area at a part of delayed line or optical waveguide, or a laser trimming technology, etc. Further, in the first embodiment, the phase adjuster 106 is arranged in the optical paths 104-1 and 104-3. However, the phase adjuster 106 may be arranged at the other position different from the first embodiment if the phase difference among the three optical paths can be adjusted relatively as a result.

Further, if a structure not generating the phase difference among the three optical paths is achieved when the quaternary optical amplitude modulator 100 is manufactured, for example, by controlling the length of the path with high accuracy or adopting a technology to exclude the temperature dependency, arrangement of phase adjuster 106 is not necessary. Therefore, the phase adjuster 106 is not an indispensable component in the embodiment.

Instead of the single drive MZ type binary optical phase modulator 105, the dual drive MZ type binary phase modulator described as the prior art is applicable. Since two sequences of binary electrical digital signal inverted to each other are required, however, the latter has possibility of degrading the suppression effect of inter-symbol-interference as compared to the former when the amplitude difference occurs among these digital signals.

The first embodiment generates the quaternary amplitude modulated signal, but can realize optical amplitude modulation having a higher multilevel number such as 8-level, 16-level, etc., by increasing the number of optical paths arranged in parallel and the number of modulators. The value of field amplitude ratio "a" and "b" is variable widely according to the signal constellation of the optical signal to be generated. For example, it is allowed to reverse the magnitude relationship of "a" and "b" or to set the values of "a" and "b" to be the same. Further, the value of field amplitude to be a reference may be set to a value larger than 1.

The magnitude of field amplitude ratios can be set to a desired value by changing the splitting ratio of the optical splitter 103 and the coupling ratio of the optical coupler 109, for example. The field amplitude ratio may be adjusted by using the loss difference in the optical paths 104-1 to 104-3, the binary optical modulators 105-1 and 105-2, and the optical phase adjusters 106-1 to 106-2 or using an optical attenuator or an optical amplifier dedicated for adjusting the optical power as described later. It is also allowed to control the optical loss by arranging in the optical path an optical modulator such as a MZ type or a field absorption type and applying DC voltage to its electrode.

Further, a configuration of the first embodiment can generate the waveform of the quaternary amplitude modulation having no inter-symbol-interference even when just π of phase deviation occurs. In this case, there is a problem that polarity of the transmitted binary digital signal is inverted.

However, as the code inversion is detectable in the receiver side, the code inversion can be automatically corrected, for example, by installing a code correcting circuit in a demodulator at the receiver side. As another method, the code inversion may be corrected at the transmitter side by providing a transmitter with a photo detector for detecting the code inversion from the optical signal generated by the quaternary optical amplitude modulator 100.

The generation of the code inversion may be detected, for example, by overlapping a low-frequency dithering signal with a bias signal to be applied to each of optical phase modulators, receiving a portion of the output light by a low-speed optical receiver installed in the transmitter, and examining the phase of the dithering signal.

Second Embodiment

FIG. 13 shows a quaternary optical amplitude modulator 100A provided with an automatic phase adjusting function as the second embodiment of the present invention.

When the length of each optical path connected to the optical coupler 109 varies, for example, due to environment temperature change or aging, the magnitude of the eye-opening in the waveform of the optical multilevel intensity modulation output from the optical coupler 109 changes and the transmission characteristics are degraded. If the eye-opening changes largely, there is a possibility that the logic values of the digital signals are inverted and the signal transmission becomes impossible. In this case, there is possibility that each signal point also changes in a phase direction so as to cause transmission deterioration by the chirp of the waveform or deterioration in the phase modulation results largely.

In the second embodiment, in order to prevent such phenomenon, a portion of output light 111 from the optical coupler 109 is guided to the photo detector (PD) 142 through an optical path 110-2 and the amplitude modulation component of the output light 111 is converted into the electrical signal. The output signal from a photo detector 142 is input to an RF detector 143 and converted into a direct current electrical signal representing the amplitude. This signal is input to a maximum value controller 145 after converting into a digital signal by an A/D converter 144.

A maximum value controller 145 generates a pair of control signals Vp1 and Vp2 so as to maximize the amplitude value represented by the output of the A/D converter 144. The control signals Vp1 and Vp2 are applied, after converted into analog signals by D/A converters 146-1 and 146-2, to the bias terminals 113-1 and 113-2 of the optical phase adjusters 106-1 and 106-2, respectively.

FIG. 14 is a flow chart showing a control algorithm to be executed by the maximum value controller 145.

The maximum value controller 145 has to control two optical phase adjusters 106-1 and 106-2 based on a detected signal observed by the RF detector 143. In this embodiment, two optical phase adjusters are controlled in a time division manner by judging the value of a parameter i (step 1401)

That is, when the parameter i is an odd number, the control signal Vp1 of the optical phase adjuster 106-1 is adjusted by a control sequence including steps 1402 to 1406. When the parameter i is an even number, the control signal Vp1 of the optical phase adjuster 106-2 is adjusted by the control sequence including steps 1412 to 1416. The value of the parameter i is incremented (i=i+1) each time the control sequence is executed.

For example, in the case where the parameter i is an odd number, the control signal Vp1 is increased by a constant value ΔV (1402) and it is determined whether the output of the RF detector 143 (output of tan A/D converter 144) has increased or not (1403). If the output of the RF detector has increased, another control sequence is executed after incrementing the parameter i. To the contrary, if the output of the RF detector has reduced, the control signal Vp1 is decreased by ΔV than an original value (1404), and it is determined whether the output of the RF detector 143 has increased or not (1405). If the output of the RF detector has increased, another control sequence is executed after incrementing the parameter i. When the output of the RF detector has reduced, the value of the control signal Vp1 is returned to the original value (1406) and another control sequence is executed.

When the parameter i is an odd number, the control sequence comprising steps 1412 to 1416 is performed. Steps 1412 to 1416 correspond to steps 1402 to 1406, but the control signal is replaced with Vp2.

According to the above maximum value control, even when the optical phase in each of the optical path has changed because of temperature change, for example, since the states of the optical phase adjusters 106-1 and 106-2 are automatically adjusted so as to maximize the optical intensity modulated component, the deterioration of the waveform of the quaternary optical intensity modulation is suppressed to the minimum.

To the control of the optical phase modulators 106-1 and 106-2, another control algorithm other than the embodiment, for example, a control algorithm using the steepest descent method is applicable. Although two control signals Vp1 and Vp2 are generated based on one detected signal in the embodiment, for example, it is allowed to obtain detected signals independently by applying dithering with different frequencies on the control signals Vp1 and Vp2 and extracting these dithering components separately. Although two-parameter controlling is exemplified here, the same control algorithm is applicable even when the number of optical paths or the modulators is increased.

Since the requirement for the photo detector 142 to be used in the above-mentioned maximum amplitude control is to receive the intensity modulated component of the optical signal to some extent, a low-priced detector having a narrower band than the bit rate of the binary electrical digital signal applied to each of the modulators 105 is applicable. The reason is that the data pattern of the binary digital signal to be used in communication is approximately random and the binary electrical digital signal includes wide frequency components from a high frequency to a low frequency., For example, it was confirmed that the experimental example of FIG. 3 operates without problems by perform an automatic control, using a photo detector having a bandwidth of about 5 GHz.

The circuit portion including the optical power detector 142, the RF detector 143, and the A/D converter 144 is for extracting amplitude modulated component of the optical signal and can be replaced with another circuit configuration. For example, the distribution width of output data or the maximum level and minimum level may be examined by inserting a D type flip flop just after the photo detector 142 and sampling the output electrical signal asynchronously, so that they are controlled so as to be maximum and minimum state. Further, by observing the optical spectrum components, the spectrum component corresponding to the modulation may be controlled so as to be maximum state.

For the embodiment, it is sufficient if the amplitude modulated components of the output light can be maximized in consequence. Therefore, another function circuit such as a minimum value control circuit or a constant value control circuit, etc. may be used instead of the maximum value controller 145.

In FIG. 13, the amplitude of the optical signal can be adjusted by arranging optical attenuators 140-1 and 140-2 in the optical signal paths 104-2 and 104-3 and supplying an attenuation control signal to control terminals 141-1 and 141-2 from the outside. The amount of amplitude attenuation in the optical attenuators 140-1 and 140-2 may be fixed to the optimal attenuation amount by adjusting so as to obtain a desired output waveform when the transmitter equipped with the optical amplitude modulator 100 is shipped. For example, by observing optical signal power of each optical path at just before the optical coupler 109, the attenuation amount may be controlled automatically so that each signal power is kept in a predetermined value at any time. Further, by directly observing the power level of the multilevel amplitude modulated light with the photo detector 142, a feedback control may be performed on the optical attenuators 140-1 and 140-2 so that each power level is kept in a predetermined value.

By the above-mentioned optical attenuator, even if the signal power of each optical path varies, for example, because of manufacturing error or aging deterioration, it is able to maintain the optical amplitude ratio for the optical combination in a constant value and obtain a multilevel amplitude modulated waveform having a predetermined amplitude ratio. Further, it is possible to vary the amplitude of the optical signal according to usage and obtain an optimal multilevel amplitude modulated waveform.

Third Embodiment

FIG. 15 shows a configuration example of an 8-level optical amplitude-and-phase modulator 200 (2-level in amplitude and 4-level in phase) as the third embodiment of the present invention. In the embodiment, a binary optical amplitude modulator 153 which is a basic mode of the present invention is used.

A continuous wave light 151 output from a semiconductor laser light source 150 is input to a known quadrature quaternary optical phase modulator (QPSK) 133 and converted into quadrature quaternary phase modulated light 152-1. The quadrature quaternary phase modulated light 152-1 is input to a binary optical amplitude modulator 153, whereby subjected to chirp-less binary amplitude modulation. In the binary optical amplitude modulator 153, the input quadrature quaternary optical phase modulated light 152-1 is split into the first optical path 104-1 and the second optical path 104-2. The input light of the first optical path 104-1 is input to the optical coupler 109 in the state of the continuous wave light. On the other hand, the input light of the second optical path 104-2 is subjected to binary phase modulation by the single drive MZ type binary optical phase modulator 105, converted into an optical signal 135 having been adjusted its amplitude to "a" and phase difference to 0 by a variable attenuator 140 and a phase adjuster 106, and input to the output coupler 109.

In order to facilitate the understanding, it is assumed that the input light 152-1 of the binary optical amplitude modulator 153 is the continuous wave. In this case, the output light of the binary optical amplitude modulator 153 is called a binary intensity modulated light 111. At this time, the output light signal 135 of the second optical path is a binary phase modulated light. If there is no deviation in phase, the signal constellation of the binary phase modulated light becomes two points (radius="a", phase=0 or π) as shown by black circles in FIG. 16(A). If optical phase is deviated by θ from a predetermined value, the signal constellation becomes two points (radius="a", phase=0 or π+0) shown by white circles in FIG. 16(A).

If there is no phase deviation, when the continuous wave light 152-2 of the amplitude "1" passing through the first optical path 104-1 is combined with the output light signal 135 of the second optical path by the optical coupler 109, the signal point of the binary intensity modulated light 111 becomes two points: (1−a, 0) and (1+a, 0) as shown on the left in FIG. 16(B). At this time, the binary intensity modulated light 111 becomes the ideal binary amplitude modulated light in which inter-symbol-interference is suppressed as shown on the right in FIG. 16(B).

In the embodiment, it is possible to set the extinction ratio of the space level L0 optionally by the amplitude ratio "a". For example, when a=1, complete extinction (L0=0) is achieved and when a=0.5, the extinction ratio becomes ⅓. In the case where a general MZ type optical amplitude modulator is used, the waveform rectifying effect is lost at the space level with the deterioration of the extinction. In the embodiment, however, it is possible to generate a good waveform in which inter-symbol-interference is suppressed at any time.

A left diagram of FIG. 16(C) shows the signal points of binary intensity modulated light 111 in the case where phase deviation θ exists. In this case, two signal points rotate by an angle θ where the origin is (1, 0) as shown by a white circle. In the power waveform of the binary intensity modulated light 111, as shown at the right of FIG. 16(C), an inside signal point (coordinate=(1−a, 0), power=L0) is away from the origin point and an outside signal point (coordinate=(1+a, 0), power=L1) approaches the origin point in accordance with the phase rotation by an angle θ. As a result, each power level becomes "L0'" and "L1'" and the amplitude of the power waveform is reduced. By maintaining the amplitude maximum at any time, the waveform of the binary optical amplitude modulation can be maintained optimal at any time. This is the principle of the maximum value control to be used in generating the optical amplitude modulation waveform in the present invention. This control is also applicable to amplitude modulation more than two-level in the same way.

Further, the above-mentioned control is effective in the case where the other modulation, for example, the quadrature quaternary phase modulation as shown in FIG. 15 is applied to the input light 152-1. When the input light 152-1 is the quaternary phase modulated light, the output light 157 becomes correct 8-level amplitude-and-phase modulation if there is no phase deviation.

The signal constellation of the 8-level amplitude-and-phase modulated light becomes a double concentric circle constellation (4-level in phase and 2-level in amplitude) in a radial direction as shown by eight black circles in FIG. 16(D). When phase deviation θ occurs in the binary optical amplitude modulator 153, a signal point on the inside circle and a signal point on the outside circle rotate in pairs. As a result, the signal constellation is rotated by θ, where the origin is the signal point of the original quaternary phase modulation shown in FIG. 10(B), and transits to an incomplete constellation as shown by white circles in FIG. 16 (D). With this transmission, the distance between the signal points on the inside circle and the signal points on the outside circle is shortened and the amplitude modulated component becomes small.

In this case, the influence of the phase deviation can be suppressed if the amplitude modulated component is controlled so as to be maximized as described above. The above-mentioned maximum value control is effective to maintain the signal constellation in good state at any time in the case where complicated modulation other than the quaternary phase modulation is applied to the input light.

Fourth Embodiment

FIG. 17 shows a configuration example of a quaternary optical amplitude-and-phase modulator 154 for modulating to 2-level in amplitude and 4-level in phase as the fourth embodiment of the present invention.

In the embodiment, the input light 101 is split into the first optical path 104-1 and the second optical path 104-2 by the optical splitter 103. In the first and second optical paths 104-1 and 104-2, single drive MZ type binary optical phase modulators (BPSK) 105-1 and 105-2 and variable optical attenuators 140-1 and 140-2 are arranged, respectively. In the second optical path 103-2, an optical phase modulator 106 is further arranged. The binary phase modulated light 107-1 and 107-2 output from the first and second optical paths are combined by the optical coupler 109. Further, the optical phase adjuster 106 is controlled by the maximum value control unit 145 in similar to the second embodiment shown in FIG. 13.

The above configuration is similar to the quadrature quaternary phase modulator of the prior art shown in FIG. 9 at the first glance. However, the fourth embodiment is different from the quadrature quaternary optical phase modulator of the prior, in a structure that the output optical signals of the first and second optical paths are combined (interfered) so that the phase difference is 0 by the optical coupler 109, and the optical phase modulator 106 is automatically controlled to maintain the state. Further, this embodiment is different from the quadrature quaternary optical phase modulator of the prior art, in a structure that the optical coupler 109 combines two optical signals at different amplitude ratio a:b by intentionally attenuating one of two optical signals (binary phase modulated light) input to the optical coupler 109 by the variable attenuator 140-2, in this example, the optical signal of the second optical path.

Here, the principle of the quaternary amplitude-and-phase modulation will be described with reference to FIGS. 18(A) to 18(D).

The signal constellation of the binary phase modulated light 107-1 of the first optical path is the same as FIG. 2(B) and the signal constellation of the binary modulated light 107-2 of the second optical path is shown by black circles in FIG. 18(A).

In FIG. 18(A), white circles represent signal points in the case where the phase of optical signal deviates by θ.

If assuming that the amplitude is in a relation: b<a, the signal point of an optical signal 156 obtained by combining the optical signals 107-1 and 107-2 becomes 4 points with coordinates (−a−b, 0), (−a+b, 0), (a−b, 0), and (a+b, 0).

These signal points are arranged on a real axis as shown in the left diagram of FIG. 18(B) and the amplitude-and-phase modulated light has 2-level of amplitude (a−b and a+b) and 0 or π of phase. The right diagram of FIG. 18(B) shows the power waveform of the amplitude phase modulated light, wherein the level L0 corresponds to the signal point of amplitude a−b and the level L1 corresponds to the signal point of the amplitude a+b.

The left diagram of FIG. 18(C) shows the signal constellation in the case where the phase of optical signal deviates by θ. As described above, each signal point rotates around the signal point of the original binary phase modulated light 107-1 by the θ of phase deviation. As a result, the upper opening reduces in the power waveform as shown in the right diagram of FIG. 18(C). Therefore, also the fourth embodiment can maintain the signal constellation in an optimal state having no phase distortion as shown in FIG. 18(B), by detecting the amplitude modulated component of the output waveform by the RF detector 143 and controlling the optical phase modulator 106 by the maximum value controlling circuit 145 so as to make the detected amplitude modulated component maximum.

In the fourth embodiment, it is able to generate an optical multilevel amplitude-and-phase modulated light 156 having an arbitrary extinction ratio (L0/L1) by adjusting the ratio a:b. Herein, the amplitude values "a" and "b" are assumed to have different value from each other. If it is assumed that a=b as in the quadrature quaternary optical phase modulator of the prior art, desired modulated light is not obtained because two signal points near the origin point overlap mutually and the signal constellation of the combined output optical signal 156 becomes ternary as shown in FIG. 18(D).

Fifth Embodiment

FIG. 19 shows a configuration of an optical duobinary modulator 155 which is a kind of a ternary optical multilevel amplitude-and-phase modulator, as the fifth embodiment of the present invention. In this embodiment, the three points signal constellation degenerated when the relation of amplitude values is in a state a=b in the fourth embodiment is actively used. Accordingly, the configuration of optical duobinary modulator 155 shown here is like the quaternary optical amplitude and phase modulator 154 shown in FIG. 17. In the fifth embodiment, the outputs D0 and D1 of a duobinary coder 161 are supplied to the modulated signal input terminals 112-1 and 112-2 of the single drive MZ type binary optical phase modulators 105-1 and 105-2.

FIG. 20(A) shows the signal constellation of the optical duobinary modulated signal. This is the same as the signal constellation shown in FIG. 18(D). The optical duobinary modulated signal is a partial response code using the redundancy of the phase and amplitude of an optical multilevel signal and the binary electric digital signals D0 and D1 to be supplied to the single drive MZ type binary optical phase modulators 105-1 and 105-2 are generated by coding the binary digital signal D input to the data signal input terminal 160 with the duobinary coder 161.

FIG. 20(B) shows the coding rule of the duobinary coder 161. Herein, n represents the bit number of the input data and the digital value of n-th bit is represented by $D(n)=0$ or $D(n)=1$. The coding rule of the duobinary code $DB(n)$ is represented as follow.

$$DB(n)=D(n)+D(n-1).$$

From the coding law, the value $DB(n)$ becomes ternary of 0, 1, 2 corresponding to the combination of the input digital values $D(n)$ and $D(n-1)$ as shown in FIG. 20(B). These three states can be sequentially allocated to three signal points (−2a, 0), (0, 0), and (2a, 0) as shown in FIG. 20(A).

In this case, the combination of the digital signal D0(*n*) and D1(*n*) to be actually applied to the single drive MZ binary phase modulators 105-1 and 105-2 for generating each signal point may be set to D0(*n*)=D(n−1) and D1(*n*)=D(n), by inversely calculating from the combination of D0(*n*) and D(n−1). Therefore, the duobinary coder 161 may be configured so as to output the input digital D(n) as D1(*n*) as it is, and a 1-bit delayed signal of D(n) as D0(*n*) as shown in FIG. 20C.

This embodiment can generate the optical duobinary signal 162 by a modification of the quaternary optical amplitude-and-phase modulator (ternary optical multilevel amplitude-and-phase modulator). With the fifth embodiment, a particular duobinary coder such as a low-pass filter, an electrical signal adder, etc., as in the prior art becomes unnecessary. Further, since the optical waveform is almost a rectangle as shown in the right diagram of FIG. 20(A), the deterioration of the receiver sensitivity is smaller than that of the optical duobinary waveform generated by the prior art.

When the waveform of the optical signal excessively approximates the rectangle, there is possibility of expanding the spectrum bandwidth of the optical signal. This problem can be solved, however, by locating a low-pass filter for band limitation in the middle of a modulated signal input line 112 or eliminating an extra band from the output optical signal by a narrowband optical band-pass filter.

In the embodiment of FIG. 19, the optical duobinary waveform having three optical signal points is generated from the binary digital signal, but it is also possible to generate more complicated optical duobinary waveform (for example, 3-level in amplitude and 5-level in phase, by the same rule. According to the embodiment, therefore, it becomes possible to perform communication being applied codes higher in the transmission efficiency.

Sixth Embodiment

FIG. 21 shows a multilevel optical amplitude modulator 100B as the sixth embodiment of the present invention. In the multilevel optical amplitude modulator 100B, the optical coupler 109 of the first embodiment is divided into a plurality of sub-optical couplers 109-1 and 109-2 so that optical signals passing through different optical paths are sequentially interfered by these sub-optical couplers and a control signal to be supplied to each optical phase adjuster is generated on the basis of individual detection signal extracted from the output of each of the sub-optical couplers.

Like the first embodiment, the input light is split into the first, second, third optical paths 104-1, 104-2, and 104-3. In the first and third optical paths 104-1 and 104-3, optical phase adjusters 106-1 and 106-2 are arranged, and single drive MZ type binary phase modulators 105-1 and 105-2 are arranged in the second and third optical paths 104-2 and 104-3, respectively. The second and third optical paths have the same construction as the fifth embodiment. Therefore, the ternary amplitude-and-phase modulated light 162 having high extinction degree is output from the sub-optical coupler 109-2 for coupling the second and third optical paths.

The output light 162 of the sub-optical coupler 109-2 is combined with the output light of the first optical path 104-1 by the sub-optical coupler 109-1 to produce the output light 165 of the multilevel optical amplitude modulator 100B. In the case where the amplitude of the output light signal of the first optical path 104-1 equals to 1, the amplitude "a" and "b" of output light signals of the second and third optical paths 104-2 and 104-3 are adjusted to be 0.5 by the variable attenuators 141-1 and 141-2, respectively. The optical phases are matched with each other.

In the embodiment, the output lights of the second and third optical paths 104-2 and 104-3 are combined by the sub-optical coupler 109-2. The output light 162 from the sub-optical coupler 109-2 is ternary amplitude-and-phase modulated light having the signal constellation shown in FIG. 20(A). A portion of the output light 162 is input to the photo detector 142-2 and converted into the bias voltage Vp2 to be applied to the phase adjuster 106-2, by passing through an RF detector 143-2, an A/D converter 144-2, an maximum value controller 145-2, and an D/A converter 146-2.

The ternary amplitude-and-phase modulated light 162 output from the sub-optical coupler 109-2 is combined (interfered) with the continuous wave light 108 passing through the first optical path by a sub-optical coupler 109-1 to produce output light 165. The signal constellation of the output light 165 is represented by black circle shown in the left diagram of FIG. 22(A).

In this embodiment, the extinction degree of the modulated light is increased by setting the amplitude a=0.5 and b=0.5 so that the signal points having the minimum amplitude are matched with the origin point. As shown in the right diagram of FIG. 22(A), in the power waveform of the output light 165, the intensity L0 having the lowest level is 0 and two eye-openings up and down are formed among three signal levels L0, L1, and L2.

A portion of the output light 165 is input to the photo detector 142-1 and converted into the bias voltage Vp1 to be applied to the phase adjuster 106-1 by passing through an RF detector 143-1, an A/D converter 144-1, a maximum value controller 145-1, and a D/A converter 146-1.

In the embodiment, the control systems of the phase adjusters 106-1 and 106-2 are formed independently by connecting the sub-optical coupler in a multi-stage. With this configuration, since each phase adjuster is controlled based on the individual observation amount (detected amount), it is possible to improve the control accuracy of the phase deviation and generate a small deterioration of waveform with small control error small.

Further, the three signal points shown in the left diagram of FIG. 22(A) are originally at positions of four signal points as shown in FIG. 18(B), but it looks like a ternary optical signal in appearance because two of the four signal points overlap at the same position. Thus, in the embodiment, the ternary electrical data signal 163 to be transmitted is input to the coder 164 and binary electrical digital signals D0 and D1 to be input to two single drive MZ type optical phase modulators 105-1 and 105-2 are generated by the coder 164. The coder 164 generates a true ternary optical amplitude modulated signal according to a truth table shown in FIG. 22(B).

This embodiment is applicable to an optical multilevel signal transmission having an arbitrary number of signal levels that is not limited to power-of-two, by partially overlapping the signal points of the optical signal with each other so as to be degenerated as described above and performing appropriate multilevel coding by the coder.

Next, an example of transmitting the quaternary amplitude multilevel signal, to which gray coding is applied, according to the modulator configuration shown in FIG. 21 will be described. In the circuit structure of FIG. 21, when the variable attenuators 140-1 and 140-2 are adjusted so that the ratio of optical signal amplitude of the second and third optical paths is b<a<0, the signal constellation of the multilevel amplitude-and-phase modulated light 156 corresponds to the quaternary amplitude-and-phase modulated light as shown in FIG. 23(A). When the continuous wave light 108 with amplitude 1 having passed through the first optical path is added to the multilevel amplitude-and-phase modulated light 156, the signal constellation of the generated output light 165 becomes that of the quaternary amplitude modulated light as shown in FIG. 23(B).

The output light 165 is usable to the quaternary multilevel signal transmission. However, if the output light is transmitted as it is, there is possibility of causing 2-bit errors, for example, in the case where the receiver side fails in determining the optical signal because of noise, and resulting unable to correctly determine the adjacent signal points. In this case, it is preferable to use a gray coder as the coder 164 and convert the input data into the gray code according to the truth table shown n FIG. 23(C). By using the gray coder, as the quaternary input signal 163 can be allocated to the four signal points "1−a−b", "1−a+b", "1+a−b" and "1+a+b" every 2-bit unit, it is possible to limit the bit error caused by a determination error on the signal point (level) to 1 bit. Such a coding of input signal is generally applicable to the multilevel amplitude-and-phase modulation shown in the other embodiments of the present invention, without being limited to the sixth embodiment.

Seventh Embodiment

FIG. 24 shows a 16QAM optical transmitter 201 using the quaternary amplitude-and-phase modulator as the seventh embodiment of the present invention. The 16QAM optical signal is a complicated combination of phase and amplitude. In the seventh embodiment, the 16QAM optical signal is generated by using four-fold rotational symmetry to a center.

The 16QAM optical transmitter 201 includes a semiconductor laser light source 150, a quaternary amplitude-and-phase modulator 171, and a quadrature quaternary phase modulator (QPSK) 133-2.

The continuous wave light 151 output from the semiconductor laser light source 150 is input to the quaternary amplitude-and-phase modulator 171. The output light 172 of the quaternary amplitude-and-phase modulator 171 is input to the quadrature quaternary phase modulator (QPSK) 133-2 and output as an optical signal 173 of the 16QAM modulation.

The continuous wave light 151 input to the quaternary amplitude-and-phase modulator 171 is split into the first and second optical paths 104-1 and 104-2 by the optical splitter 103. The continuous wave light split into the first optical path 104-1 passes through the variable optical attenuator 140-1, thereby to input to the optical coupler 109 as continuous modulated light 108 having amplitude "1". The continuous wave light split into the second optical path 104-2 is converted into the quaternary phase modulated light by a quadrature quaternary phase modulator (QPSK) 133-1 and passes through a variable optical attenuator 140-1 and a optical phase adjuster 106, thereby to input to the optical coupler 109 as quadrature phase modulated light 134 of amplitude "a".

FIG. 25(A) shows the signal constellation of the continuous wave light 108, and FIG. 25(B) shows the signal constellation of the quaternary phase modulated light 134 in the case of setting the field amplitude to a=0.5. When the two optical signals are interfered at in-plane by the optical coupler 109, the output light 172 becomes quaternary amplitude-and-phase modulated light as shown in FIG. 25(C). Further, when quadrature quaternary phase modulation is applied on the quaternary amplitude-and-phase modulated light 172 by the quadrature quaternary phase modulator 133-2, the output light 173 becomes the 16QAM signal in which 16 signal points are arranged on equi-spacing grid as shown in FIG. 25(D).

As such, by connecting the phase modulator 133-2 in tandem to the multilevel amplitude-and-phase modulator 171 of the present invention, it is able to generate complicated signal constellation having N-fold rotational symmetry with respect to the origin point. Further, it is possible to generate ideal multilevel modulated light in which the inter-symbol-interference has been completely suppressed, by using as the phase modulator 133-2 connected to the multilevel amplitude-and-phase modulator 171 in tandem, a phase modulator having suppressed the inter-symbol-interference such as the single drive MZ binary phase modulator, the quadrature quaternary phase modulator, and the phase modulator having arbitrary modulation quantity, which were shown as conventional examples.

FIG. 26 is a diagram for explaining the generation principle of the output light (second optical multilevel signal) 173 in the seventh embodiment.

In FIG. 24, if the phase of the input optical signal is deviated by π/2 by the phase adjuster 106 and the field amplitude is set so as to be about a=0.3, the signal constellation of the quaternary phase modulated light 134 becomes as shown in FIG. 26(B). When the quaternary phase modulated light 134 is interfered with the continuous wave light 108 having the signal constellation shown in FIG. 26(A), the signal constellation of the output light 172 from the optical coupler 109 shifts along I-axis as shown in FIG. 26(C). When quadrature quaternary phase modulation is performed on the output light 172 by the quadrature quaternary phase modulator 133-2, as shown in FIG. 26(D), the signal constellation of the output light 173 from the quadrature quaternary phase modulator 133 becomes another state different from the signal constellation of FIG. 25(D).

According to the seventh embodiment, it is possible to realize the flexible optical transmitter because optical multilevel amplitude-and-phase modulated light having different signal constellation can be generated by changing the shift amount of the phase with the optical phase adjuster 106 and by changing the attenuated amount with the variable optical attenuator 140, as described above.

Eighth Embodiment

FIG. 27 shows a configuration of the 8-level optical amplitude-and-phase modulator 156 for generating 8-level optical amplitude-and-phase modulated signal 157 having the signal constellation in a concentric circle, as the eighth embodiment of the present invention.

The left half of the 8-level optical amplitude-and-phase modulator 156 is similar to the quadrature phase modulator according to the prior art shown in FIG. 9, but the eighth embodiment is different from the prior art in the point that the binary phase modulated lights 107-1 and 107-2 output from the binary optical phase modulators (BPSK) 105-1 and 105-2 are combined with each other after intentionally deviating in phase by a predetermined angle θ as shown in FIG. 28(A). As a result, the output light 172 becomes an optical signal modulated in both the amplitude and phase, and its signal constellation becomes a diamond arrangement with an origin point at the center as shown in FIG. 28(B).

In the embodiment, the output light 172 is input to the binary phase modulator (BPSK) 130 having a variable modulation factor and its modulation quantity is set to 90°. As a result, the output light 157 of BPSK 130 becomes 8-level amplitude phase modulated light (2-level in amplitude and 4-level in phase) in which eight signal points, as represented by black circles and white circles in FIG. 28(C), are arranged in a concentric circle. The magnitude of the amplitude modulation can be adjusted by changing the combining angle θ.

The 8-level phase modulated light as described in the embodiment may be generated, for example, by first generating the amplitude-and-phase modulated light in which all the four signal points are arranged on I-axis around the origin point as shown in FIG. 18(B) by the configuration of FIG. 17, and thereafter by performing 90° phase modulation by the binary phase modulator having a variable modulation factor. As such, the optical amplitude modulator or the multilevel optical amplitude-and-phase modulator according to the present invention is applicable to the generation of complicated multilevel amplitude-and-phase modulated light, in which the inter-symbol-interference is suppressed, by connecting in tandem to a phase modulator of the prior art, in particular, a phase modulator having characteristics of suppressing the inter-symbol-interference.

A conventional multilevel phase modulator of the prior art can generate phase modulated light only. Therefore, even if the multilevel phase modulator is connected to a phase modulator in tandem like the above embodiment, obtainable output light is only the phase modulated light, and it is impossible to obtain the effect equivalent to the present invention. Further, a conventional optical amplitude modulator or multilevel optical amplitude-and-phase modulator of the prior art cannot completely suppress the inter-symbol-interference unlike the present invention. Therefore, even if such optical amplitude modulator or multilevel optical amplitude-and-phase modulator is combined with a conventional phase modulator, it can generate only an incomplete multilevel signal with a large deterioration in its waveform.

Ninth Embodiment

FIG. 29 shows a variable multilevel optical transmitter 180 using the optical transmitter 201 shown in FIG. 24, as the ninth embodiment of the present invention.

Like FIG. 24, the continuous wave light 151 output from the laser light source 150 is input to the quaternary optical amplitude-and-phase modulator (MOD4) 171, the multilevel optical signal 182 output from the modulator 171 is input to the subsequent quadrature quaternary phase modulator (QPSK) 133, and the multilevel optical signal 183 is output to the optical output path 110. The variable multilevel optical transmitter 180 includes a CPU 181 and a variable coder 186. The CPU 181 changes the signal constellation of the transmission multilevel signal according to an instruction received from outside through a communication path 187.

In definitely, the CPU 181 changes the setup value of a variable optical attenuator or a phase adjuster installed in the quaternary optical amplitude-and-phase modulator 171 by control signals 184-1 and 184-2 so as to generate the desired signal constellation. With the change of the setup value, the CPU 181 changes the operation mode of the variable coder 186 by a code switching signal 185 so that the coding processing on an electrical data signal 188 in the variable coder 186 matches the signal constellation. As a result, a data signal received appropriate coding processing is supplied to data signal input terminals 160-1 to 160-4 from the variable coder 186.

FIG. 30 shows a modified example of the signal constellation in the ninth embodiment.

Herein, the CPU 181 changes the amplitude "a" of the quadrature quaternary phase modulated light by changing the setting of variable optical attenuator 141-2 in the quaternary optical amplitude-and-phase modulator 171 shown in FIG. 24. When a=0.5, the output light 183 becomes 16QAM modulated light having the signal constellation shown in FIG. 30(A). When "a" is changed to 1.0, the output light 183 becomes, for example, 9-QAM modulated light as shown in FIG. 30(B), where some signal points are overlapped with each other and 9 signal points are arranged in an equi-spacing grid. To the contrary, When "a" is changed to 0, the output light 182 of the quaternary optical amplitude-and-phase modulator 171 becomes the continuous wave light and the output light 183 becomes quadrature quaternary phase modulated light having the signal constellation shown in FIG. 30(C).

As the number of signal levels becomes smaller, the amount of information transmittable by the multilevel optical signal decreases, but the receiver sensitivity increases and a tolerance to the transmission deterioration such as the chromatic dispersion or non-linear effect of the optical fiber and the like is improved. Therefore, it is desirable to select the optimal signal constellation according to the SN ratio of the transmission path or the transmission distance. According to the ninth embodiment, it is possible to select, for example, the quaternary phase modulation when the transmission range is long and the SN or the waveform deterioration is large, and the signal constellation capable of transmitting information two times such as the 16-level phase modulation in the section of the short transmission distance.

Tenth Embodiment

FIG. 31 shows a configuration example of a wavelength division multiplexing optical transmission system comprising wavelength division multiplexing optical transmission equipment (WDM transmission equipment) 190-1 and 190-2 to which the variable multilevel optical transmitter 180 is applied, as the tenth embodiment of the present invention including the.

The WDM transmission equipment 190-1 is provided with a variable multilevel optical transmitters 180-1 to 180-3 connected to a wavelength multiplexer 192-1, and variable multilevel optical receivers 196-4 to 196-6 connected to a wavelength demultiplexer 195-2. The WDM transmission equipment 190-2 is provided with variable multilevel optical transmitters 180-4 to 180-6 connected to a wavelength multiplexer 192-2 and variable multilevel optical receivers 196-1 to 196-3 connected to a wavelength demultiplexer 195-1. The wavelength multiplexer 192-1 and the wavelength demultiplexer 195-1 and the wavelength multiplexer 192-2 and the wavelength demultiplexer 195-2 are connected so as to face each other by two groups of upward optical fiber transmission paths 194-1 and 194-2 and downward optical fiber transmission paths 194-3 and 194-4, respectively. In the middle of each of the optical fiber transmission paths, optical amplifiers 193-1 to 193-4 for compensating the loss of the optical signal are arranged.

On the respective optical fiber transmission paths, three different wavelengths λ1 to λ3 and λ4 to λ6 are multiplexed, respectively. The output light of each of transmitters 180 (180-1 to 180-3 and 180-4 to 180-6) is input to the optical fiber transmission path after being multiplexed by the wavelength multiplexer 192-1 or 192-2. In the opposite WDM transmission equipment, the multiplexed light is separated to each wavelength by the wavelength demultiplexer 195-1 or 195-2 and received by the variable multilevel optical receivers 196 (196-1 to 196-3 and 196-4 to 196-6). In the WDM transmission equipment 190-1 and 190-2, WDM end office control units 191-1 and 191-2 are installed, respectively.

In the WDM transmission equipment 190-1 (190-2), for example, the WDM end office control unit 191-1 (191-2) monitors the quality deterioration of received signal by transmission quality signals 198 output from signal quality monitors 197-4 to 197-6 (197-1 to 197-3) installed just after the receivers 196-4 to 196-6 (196-1 to 196-3). The monitoring result is notified to the opposite WDM end office control unit 191-2 (191-1) through a communication line 199 indicated by a dashed line. The WDM end office control unit 191-2 (191-1) can transmit more information by increasing the number of signal levels of the optical transmitter, which is transmitting data with a wavelength having a small transmission quality deterioration, on the basis of the monitoring result.

As the signal quality monitor 197, for example, a dedicated detecting circuit such as a monitor of Q-factor or waveform, an SN monitor, or a calculating unit that calculates a bit error ratio of the transmission signal, and the like may be used. Further, the communication line 199 may be a communication line independent from the optical fiber transmission path. The communication line 199 may be formed as an in-channel using monitoring packets or overhead parts of optical signals communicated on the optical fiber transmission path.

FIG. 32 shows an example of flow chart of a routine for setting the number of signal levels. This routine is executed when the WDM end office control units 191 (191-1 and 191-2) is enabled.

The control unit 191 starts communication by setting the number of signal levels of all the variable multilevel optical transmitters 180 to a minimum state (step 301). Thereafter, the control unit 191 sets a parameter i for specifying the channel (variable multilevel optical transmitter 180) to an initial value "1" and determines whether the value of parameter i exceeds the number of channels N (N=3 in FIG. 3) (step 302). If the value i exceeds N, the routine is completed.

If the value i does not exceed N, the control unit 191 increases the number of signal levels of the i-th channel transmitter 180-i by one step and notifies the opposite transmission equipment of the setting state of the number of signal levels of the i-th channel (step 303). When signal quality information detected by the opposite transmission equipment is received (step 304), the control unit 191 determines whether the signal quality is sufficient (step 305). If the signal quality is sufficient, the control unit 191 repeats steps 303 and 304, and stops the incrementing of the number of signal levels when the signal quality of i-th channel exceeds a tolerance limit. At this time, the control unit 191 returns the number of signal levels of the i-th channel transmitter 180-i to a value just before the signal quality exceeds the tolerance limit, notifies the opposite transmission equipment of the value of the number of signal levels (step 306), and executes step 302 by incrementing the value of the parameter i.

Although the above embodiment shows the case where the WDM transmission equipment includes the function of detecting the signal quality and the function of changing the number of signal levels of the transmitter, the same functions can be mounted on a variable multilevel optical transponder including a pair of a variable multilevel optical transmitters and a variable multilevel optical receiver. In this case, each of transponders may configure its modulator so as to have the optimal number of signal levels, by exchanging signal quality information with the opposite transponder to each other.

As apparent from the above plural embodiments, the present invention can generate amplitude modulated light or multilevel amplitude-and-phase modulated light having ternary or more levels modulated in both the amplitude and phase, by interfering output light from a plurality of optical paths at in-phase or an arbitrary phase angle other than $\pm\pi/2$ by using a phase modulator.

In the case where a waveform distortion suppression type is used as the phase modulator, as shown in the embodiments, since the fluctuation in the phase direction is suppressed, it is able to achieve multilevel optical amplitude-and-phase modulation having a large number of signal levels and high transmission efficiency, by combining phase modulation and amplitude modulation. Moreover, by suppressing the phase chirp of the multilevel optical intensity modulation and the inter-symbol-interference in the phase direction, it becomes able to minimize the waveform deterioration due to the chromatic dispersion caused upon transmitting the optical signal through the optical fiber, thereby to expand the transmission distance.

INDUSTRIAL APPLICABILITY

The present invention is effective in the optical transmission system using optical fibers when transmitting optical modulated signals in which the occurrence of inter-symbol-interference is suppressed.

BRIEF OF DESCRIPTION OF THE DRAWINGS

FIG. 3 is a signal waveform diagram showing experimental results according to the first embodiment;

FIG. 8 is a diagram showing the optical power waveform and the signal constellation of the binary optical phase modulator of the prior art using the signal drive MZ type optical modulator;

FIG. 9 is a diagram showing a configuration of a quadrature quaternary optical phase modulator of the prior art;

FIG. 10 is a diagram showing the signal constellation of the binary optical phase modulated light and the signal constellation of the quadrature quaternary optical phase modulated light in the quadrature quaternary optical phase modulator of the prior art;

FIG. 11 is a diagram showing a binary optical signal modulator of the prior art having an arbitrary modulation factor;

FIG. 12 is a diagram showing phase constellation for explaining the operation of the binary optical phase modulator of the prior art having an arbitrary modulation factor;

FIG. 16 is a diagram for explaining a generation principle of multilevel optical signal in the third embodiment;

FIG. 18 is a diagram for explaining the generation principle of the multilevel amplitude-and-phase modulated signal in the fourth embodiment;

FIG. 20 is a diagram for explaining the generation principle of the optical duobinary modulated signal in the fifth embodiment;

FIG. 23 is a diagram for explaining a case of using a gray coder to the multilevel optical modulator of the sixth embodiment;

FIG. 25 is a diagram showing the signal constellation for explaining the generation principle of the first multilevel optical signal in the seventh embodiment;

FIG. 26 is a diagram showing signal constellations for explaining the generation principle of the second multilevel optical signal in the seventh embodiment;

FIG. 28 is a diagram showing signal constellations for explaining the generation principle of a multilevel optical signal in the eighth embodiment;

FIG. 30 is a diagram showing signal constellations of a variable multilevel optical signal in the ninth embodiment;

EXPLANATION OF REFERENCE NUMERALS AND SYMBOLS

Figure 1:
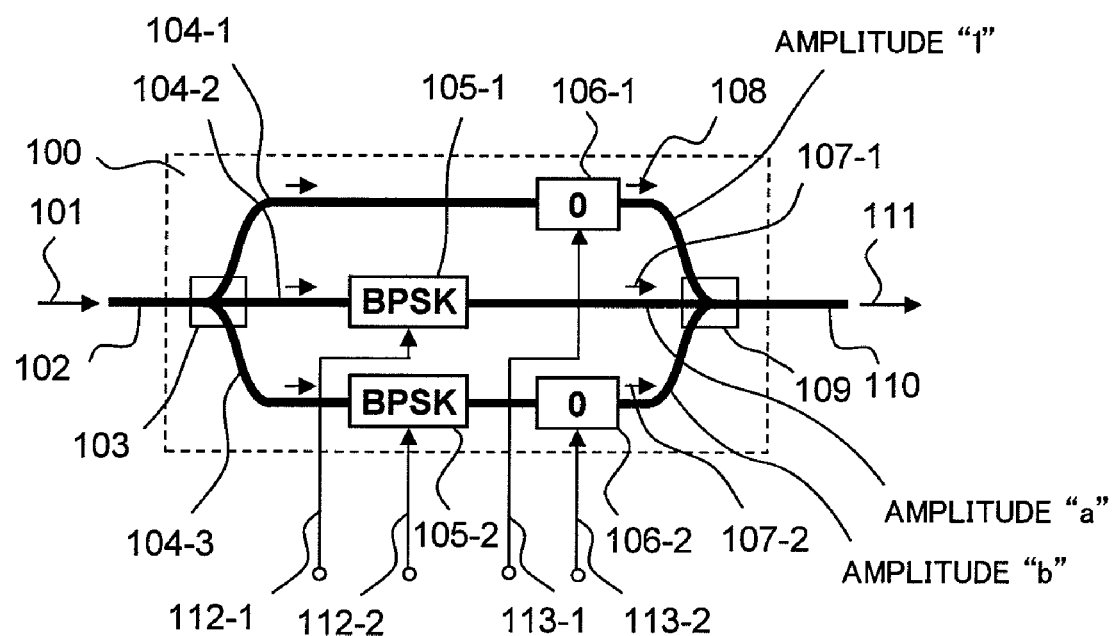
FIG. 1 is a diagram showing a configuration of a quaternary optical amplitude modulator according to the first embodiment of the present invention.
Figure 2:
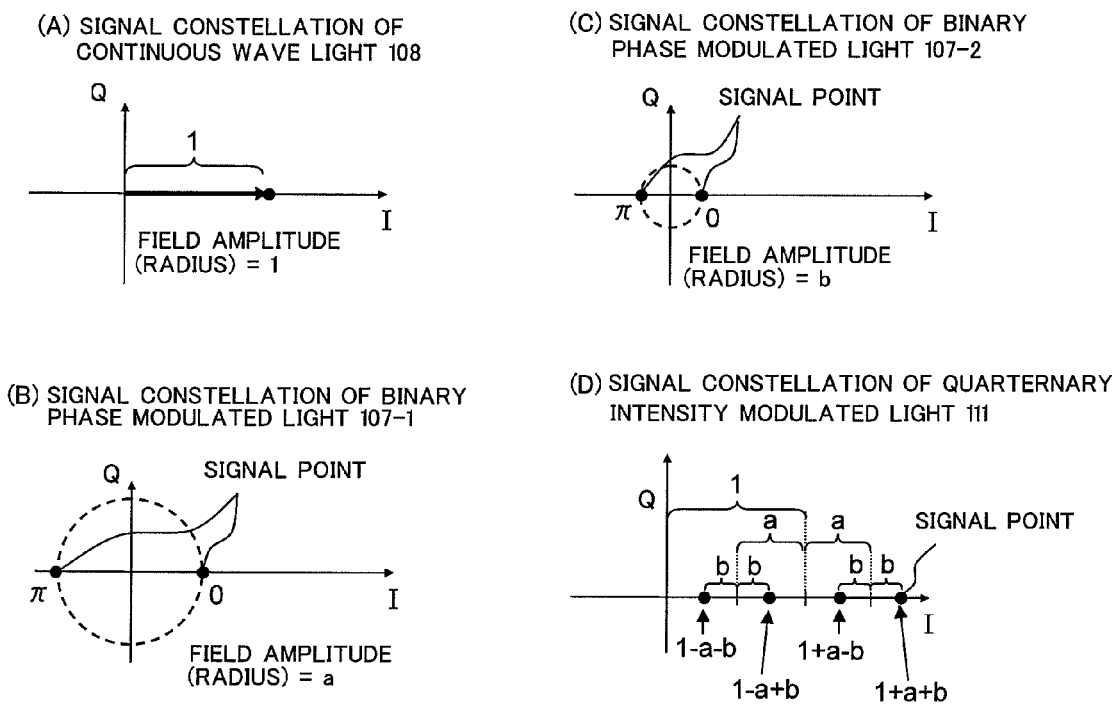
FIG. 2 is a diagram showing a generation principle of the quaternary optical amplitude modulated signal according to the first embodiment.
Figure 4:
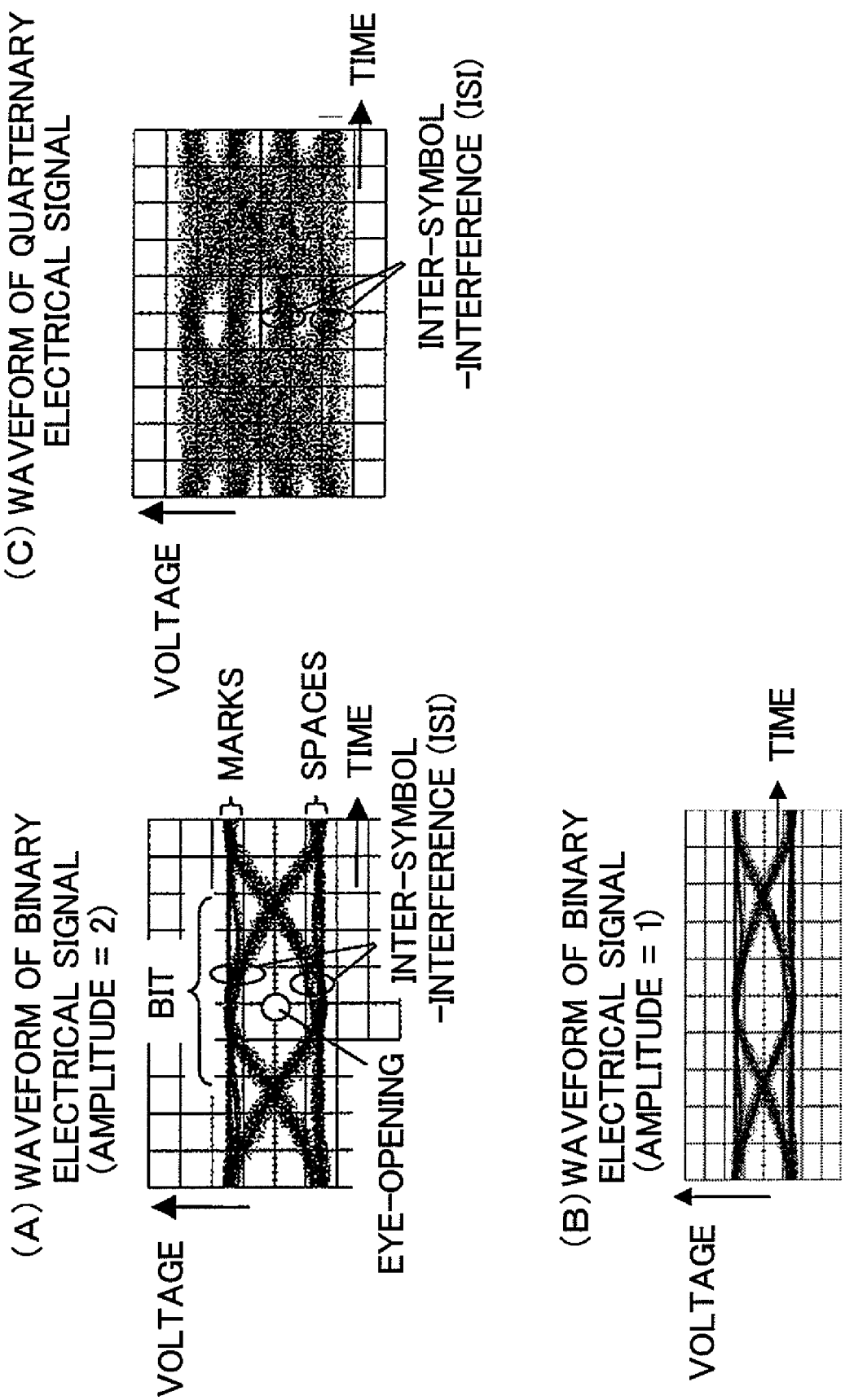
FIG. 4 is a diagram for explaining inter-symbol-interference with waveform deterioration occurring in the generation process of the optical multilevel signal.
Figure 5:
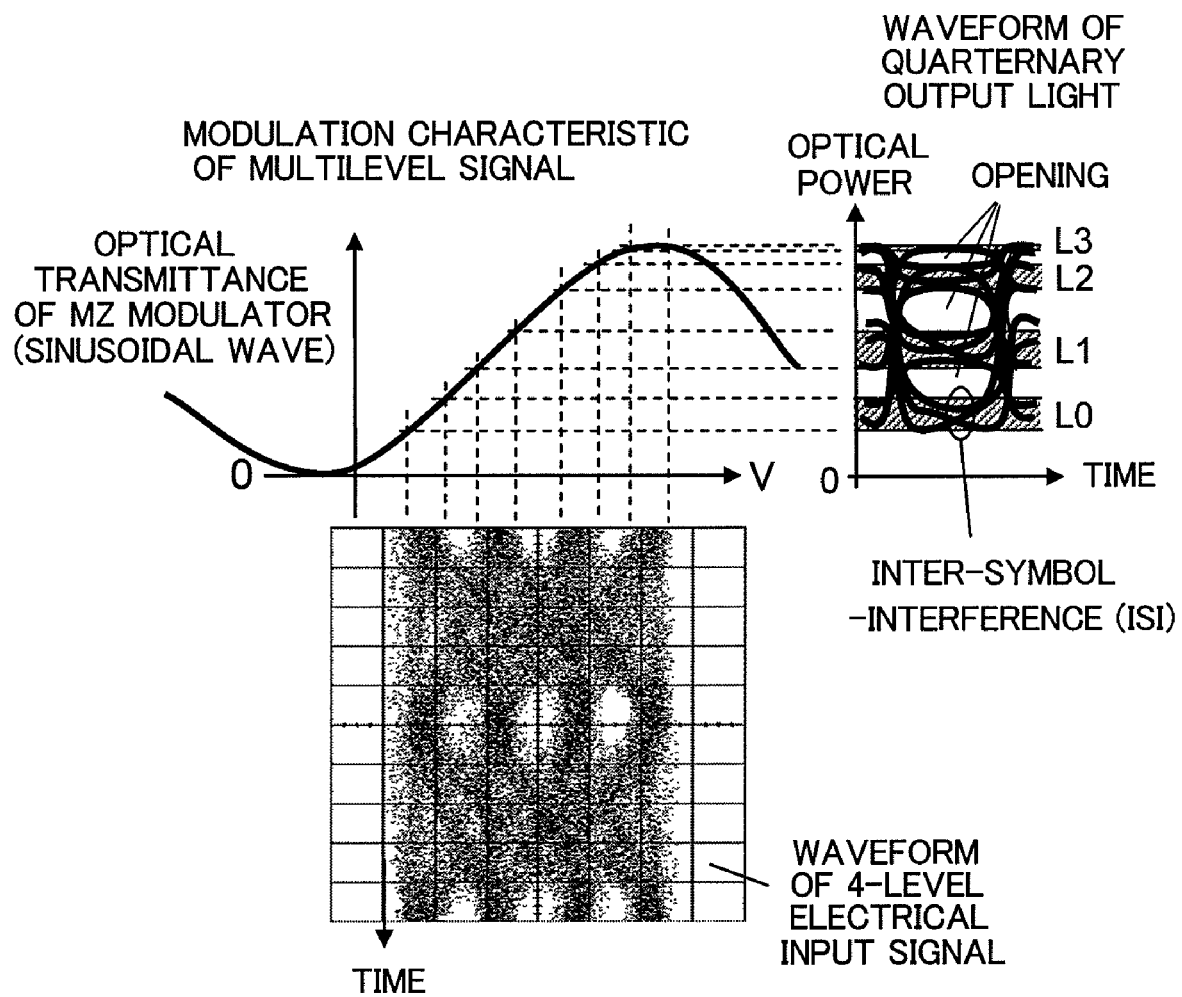
FIG. 5 is a diagram for explaining modulation characteristics of the multilevel signal.
Figure 6:
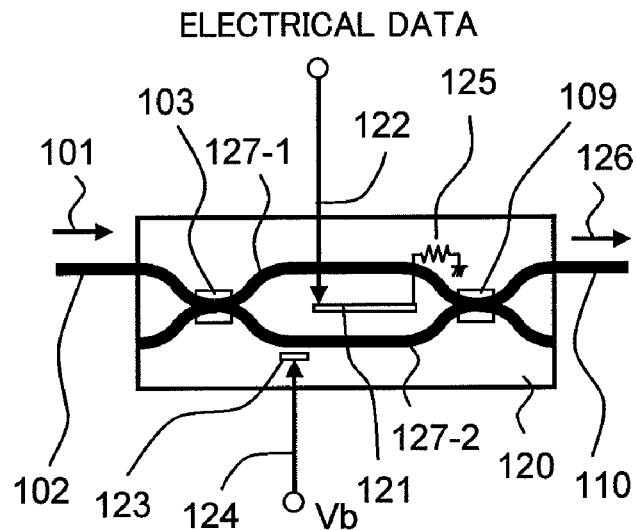
FIG. 6 is a diagram showing a configuration of a binary optical phase modulator of prior art using a single drive MZ type optical modulator.
Figure 7:
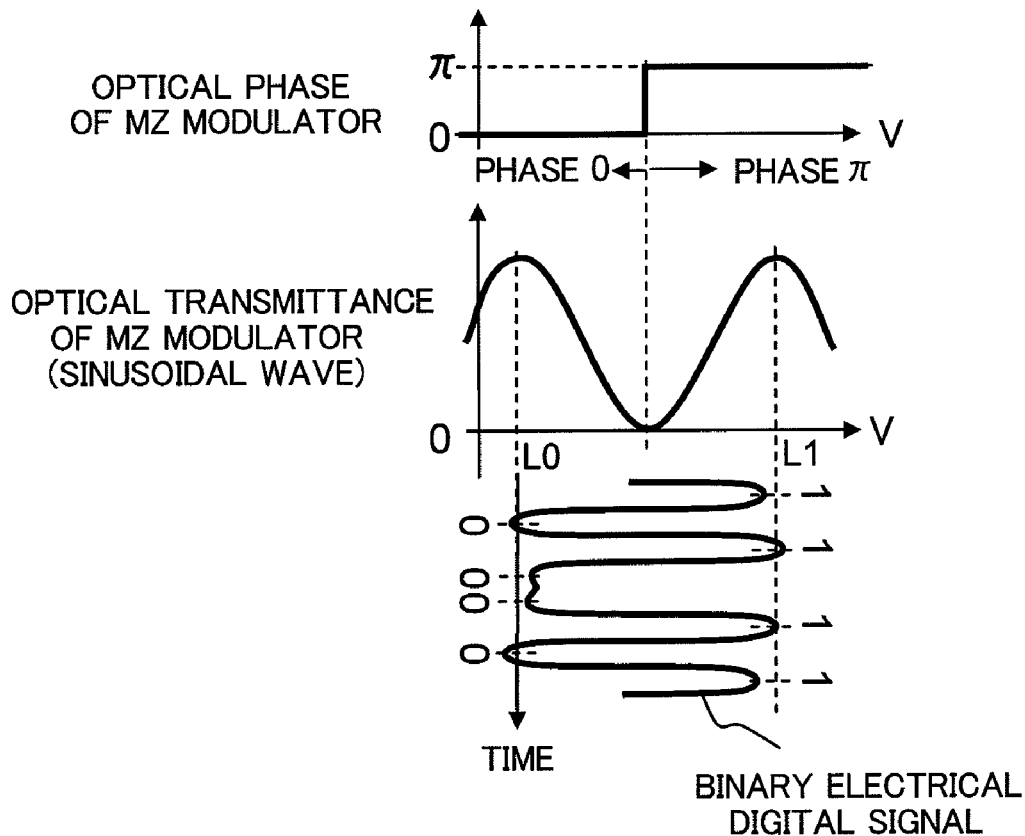
FIG. 7 is a diagram for explaining the modulation characteristics of the single drive MZ type optical modulator.
Figure 13:
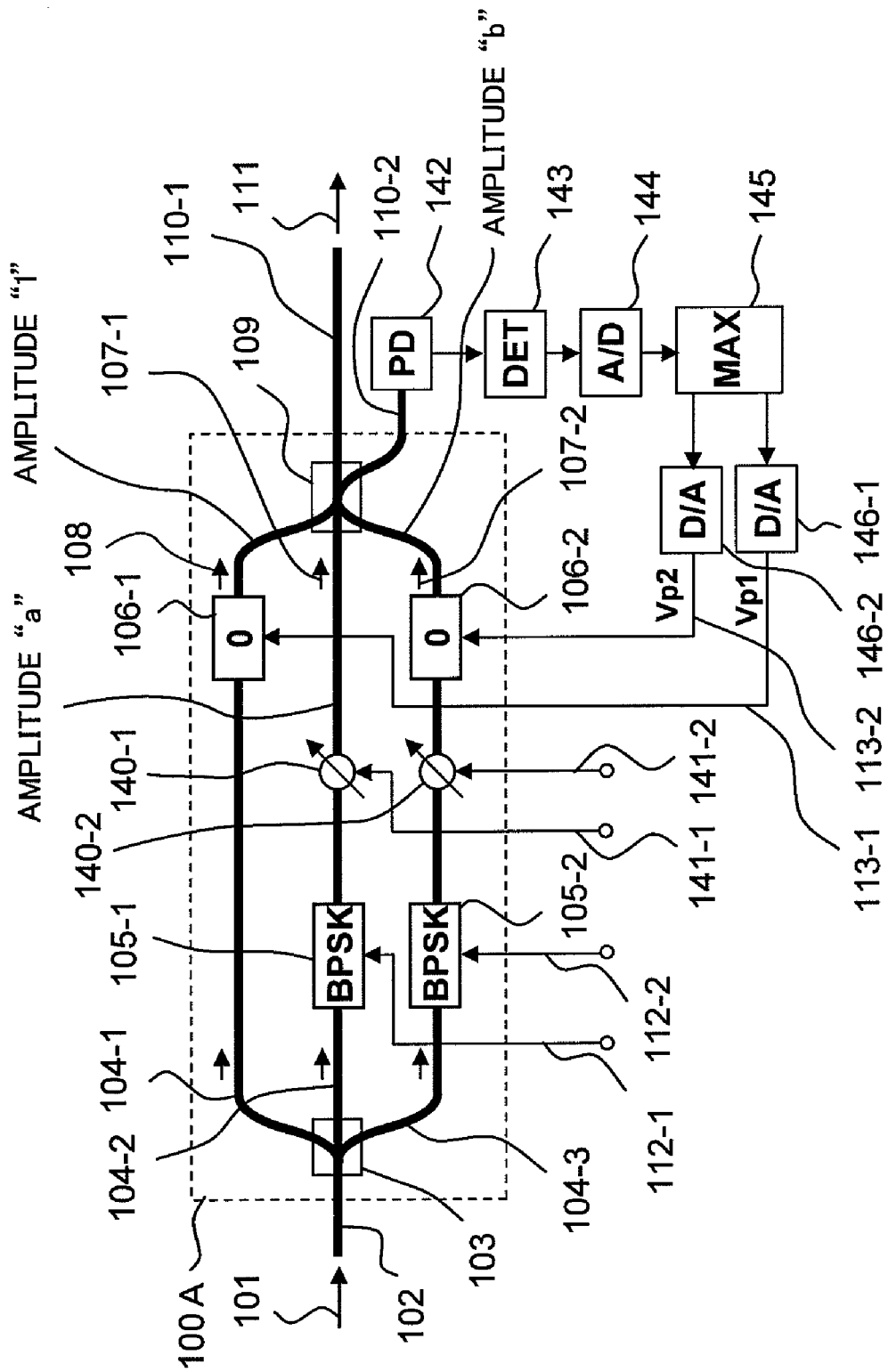
FIG. 13 is a diagram showing a configuration of a quaternary optical amplitude modulator provided with an automatic phase adjusting circuit according to the second embodiment of the present invention.
Figure 14:
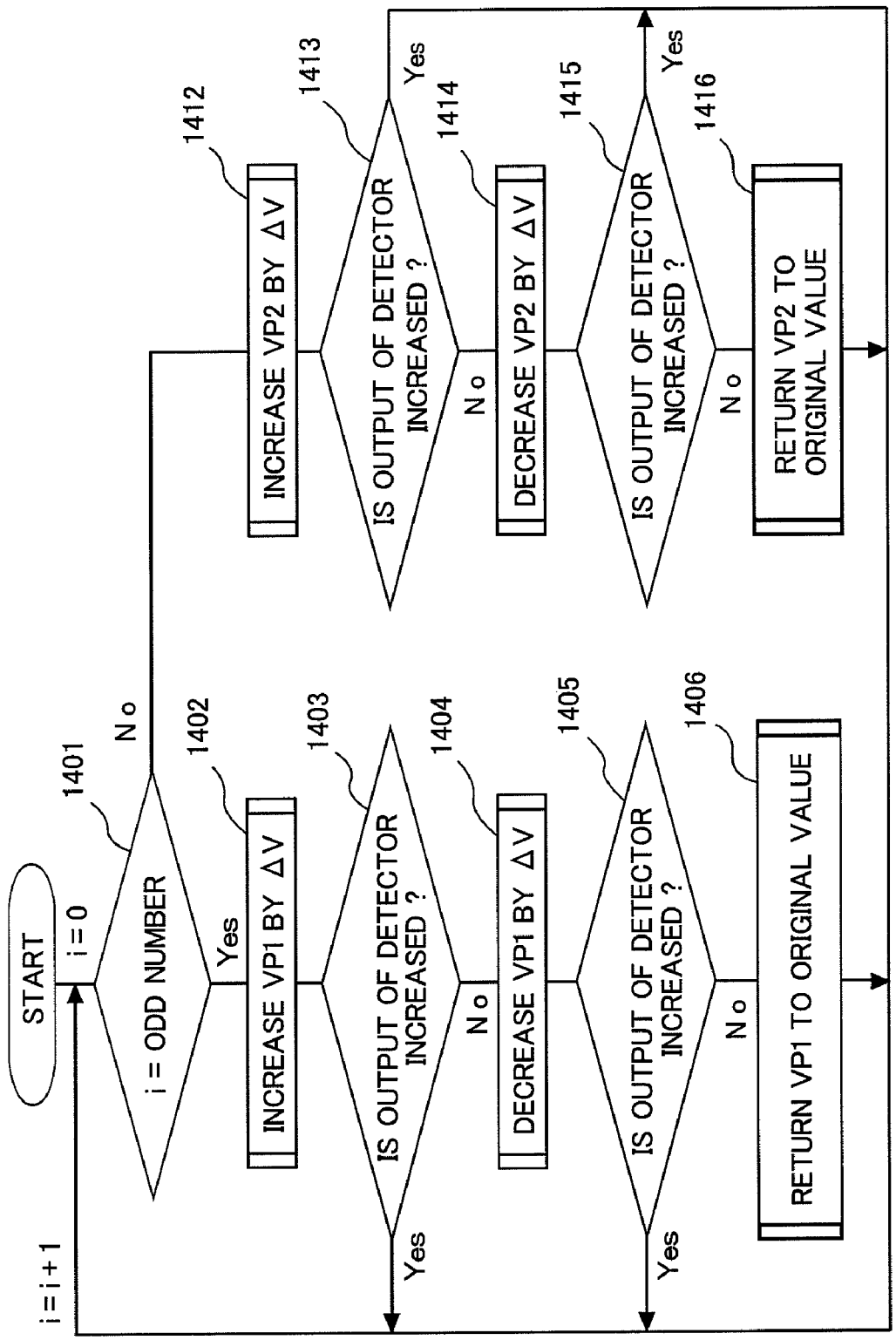
FIG. 14 is a flow chart showing the maximum value control algorithm in the second embodiment.
Figure 15:
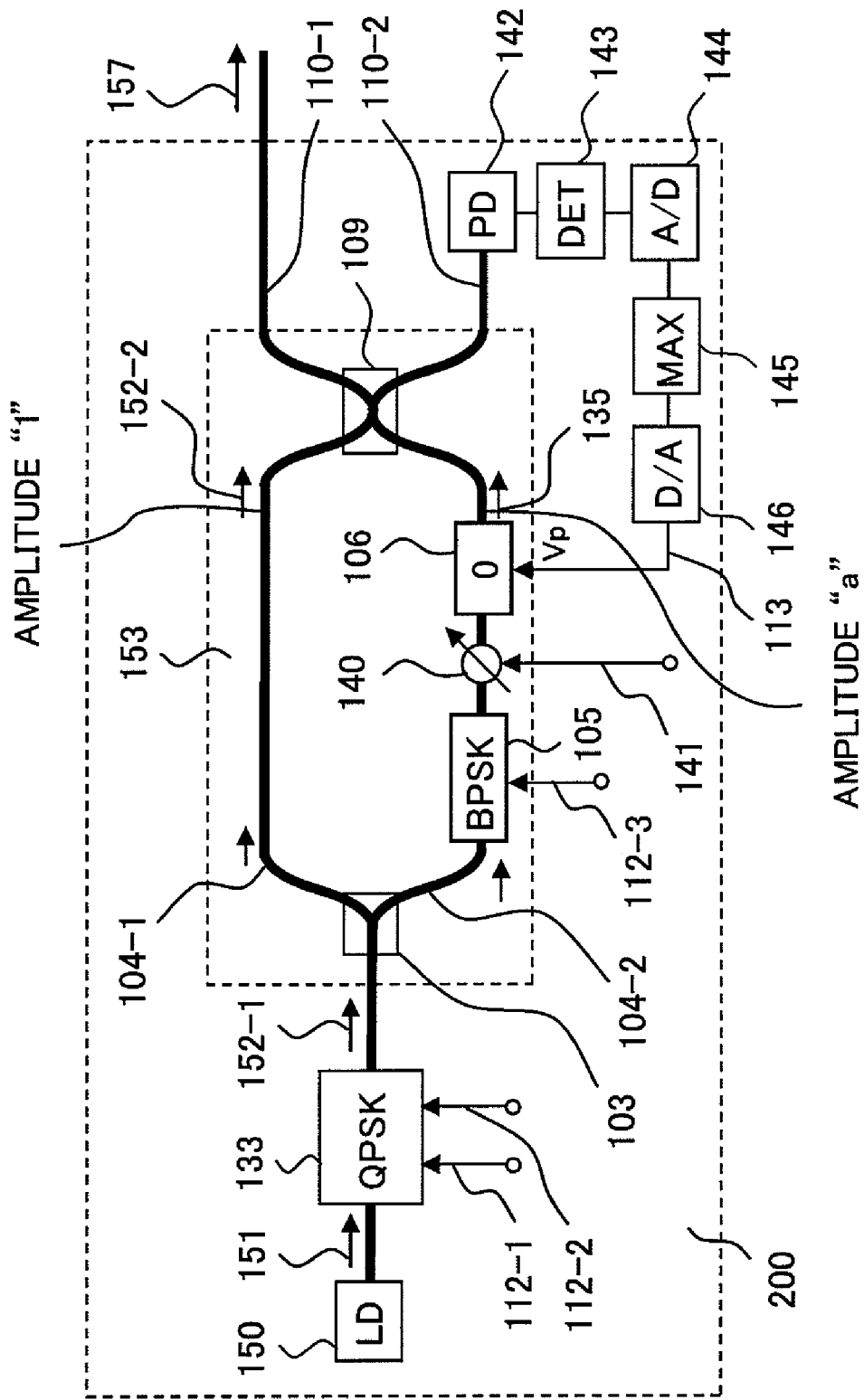
FIG. 15 is a diagram showing a configuration of an 8-level optical amplitude-and-phase modulator according to the third embodiment of the present invention.
Figure 17:
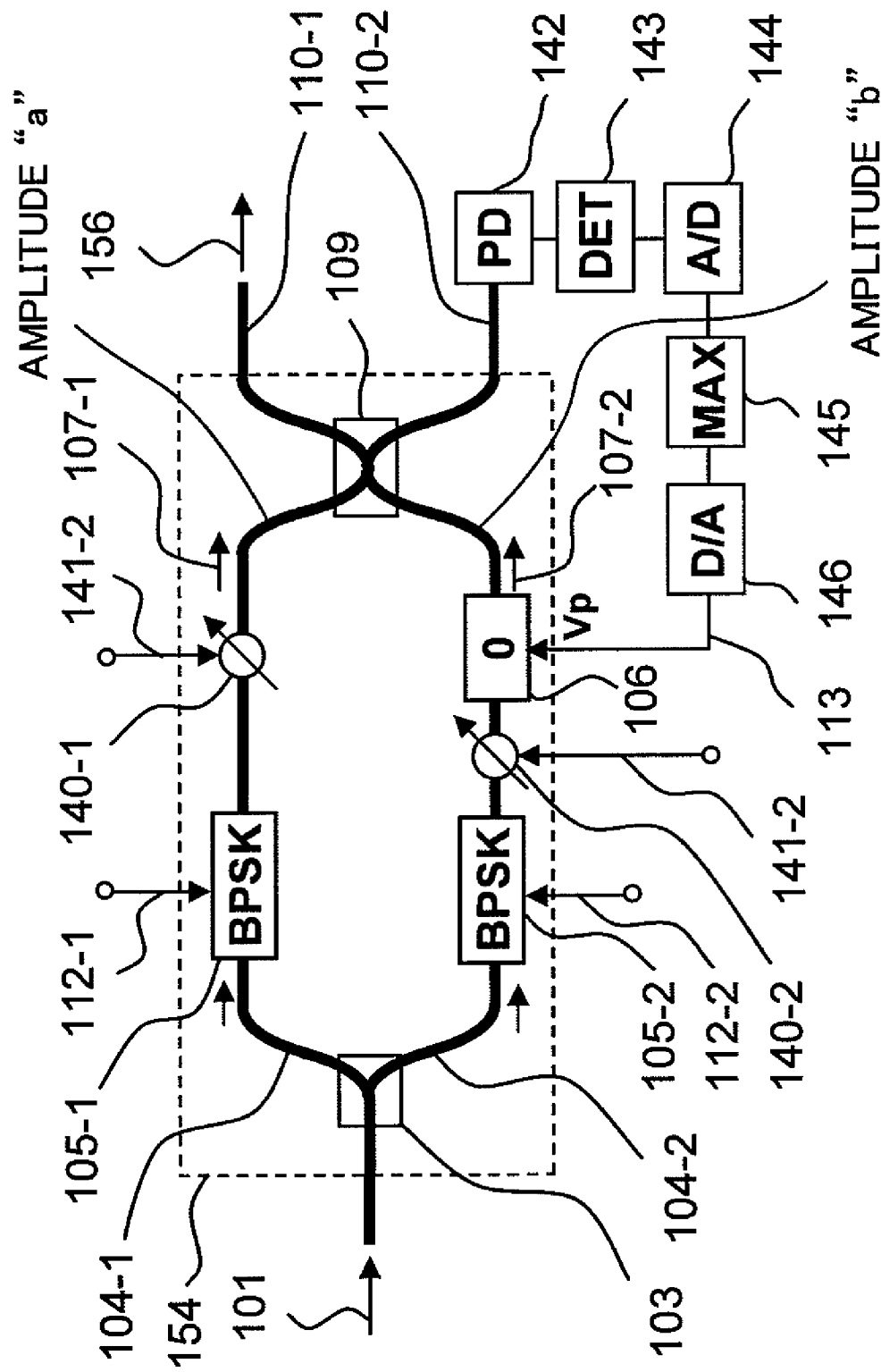
FIG. 17 is a diagram showing a configuration of a quaternary optical amplitude-and-phase modulator according to the fourth embodiment of the present invention.
Figure 19:
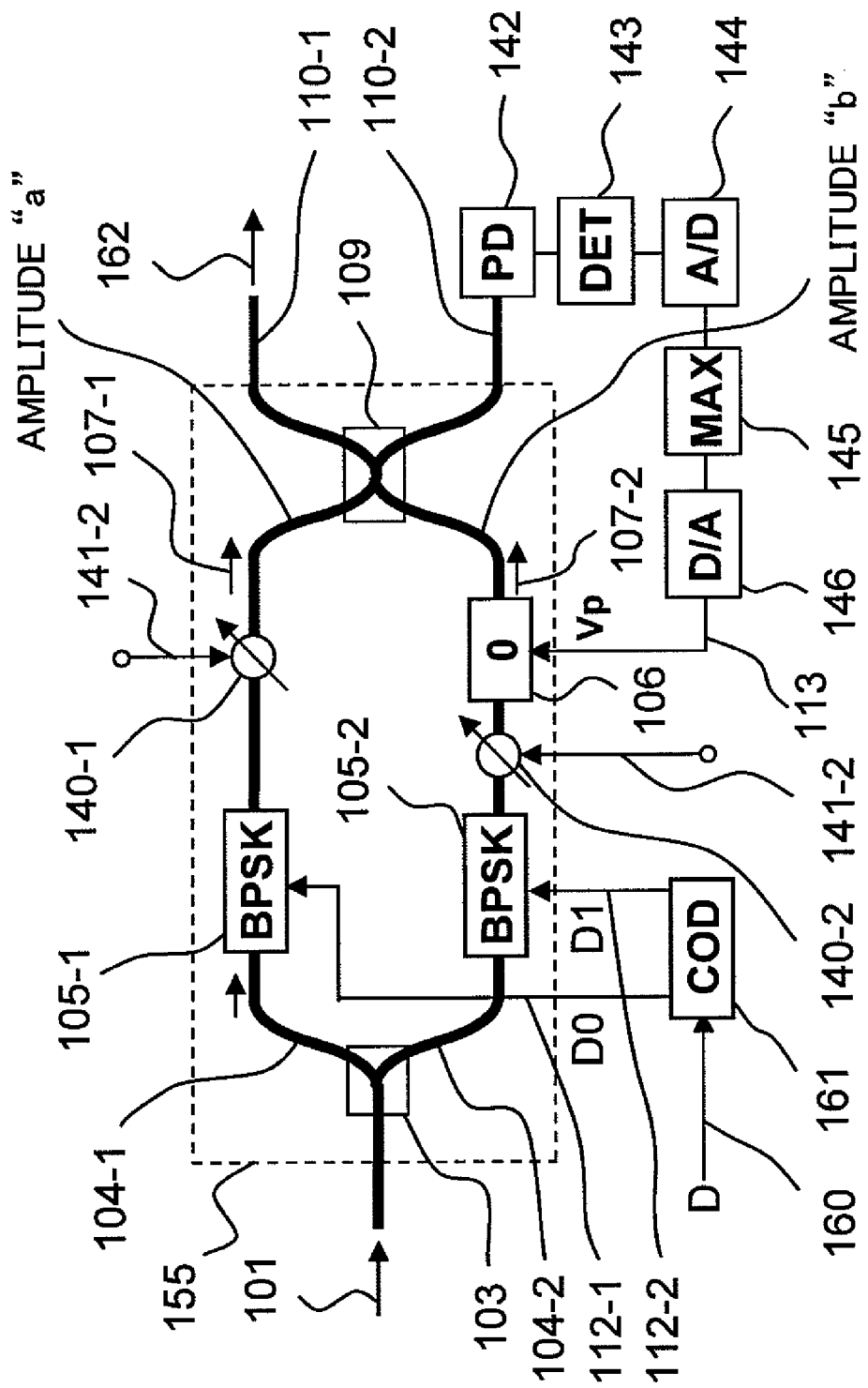
FIG. 19 is a diagram showing a configuration of an optical duobinary modulator according to the fifth embodiment of the present invention.
Figure 21:
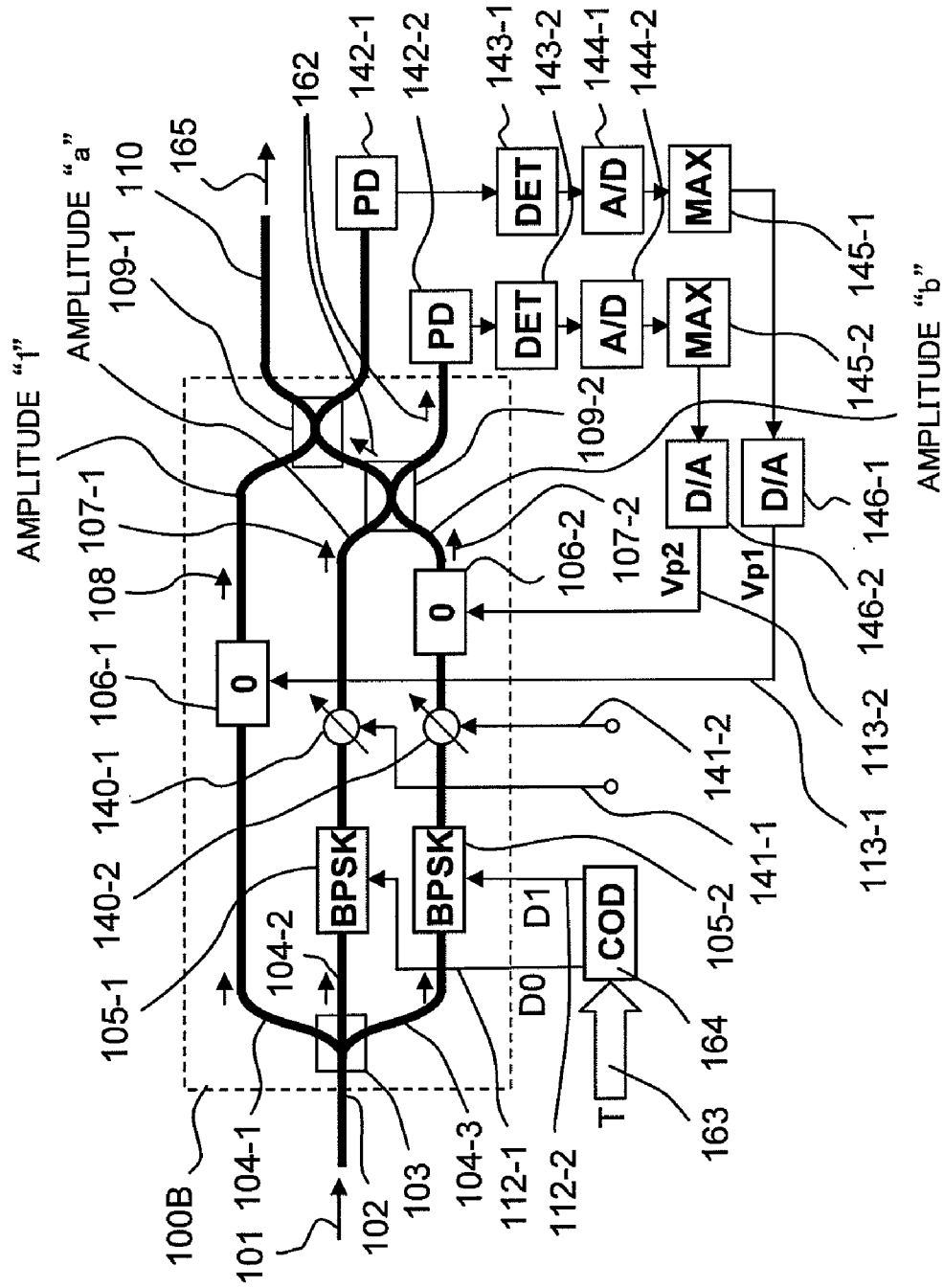
FIG. 21 is a diagram showing a configuration of a multilevel optical modulator according to the sixth embodiment of the present invention.
Figure 22:
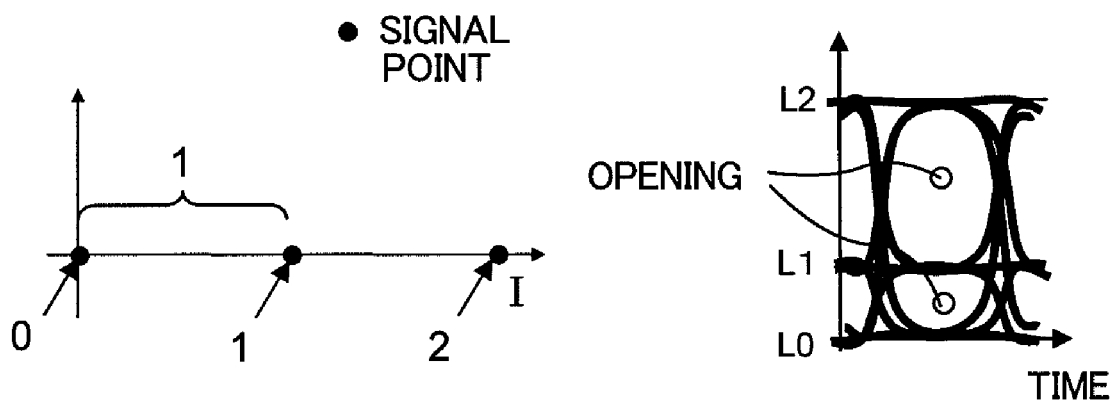
FIG. 22 is a diagram for explaining the generation principle of a multilevel optical signal in the sixth embodiment.
Figure 24:
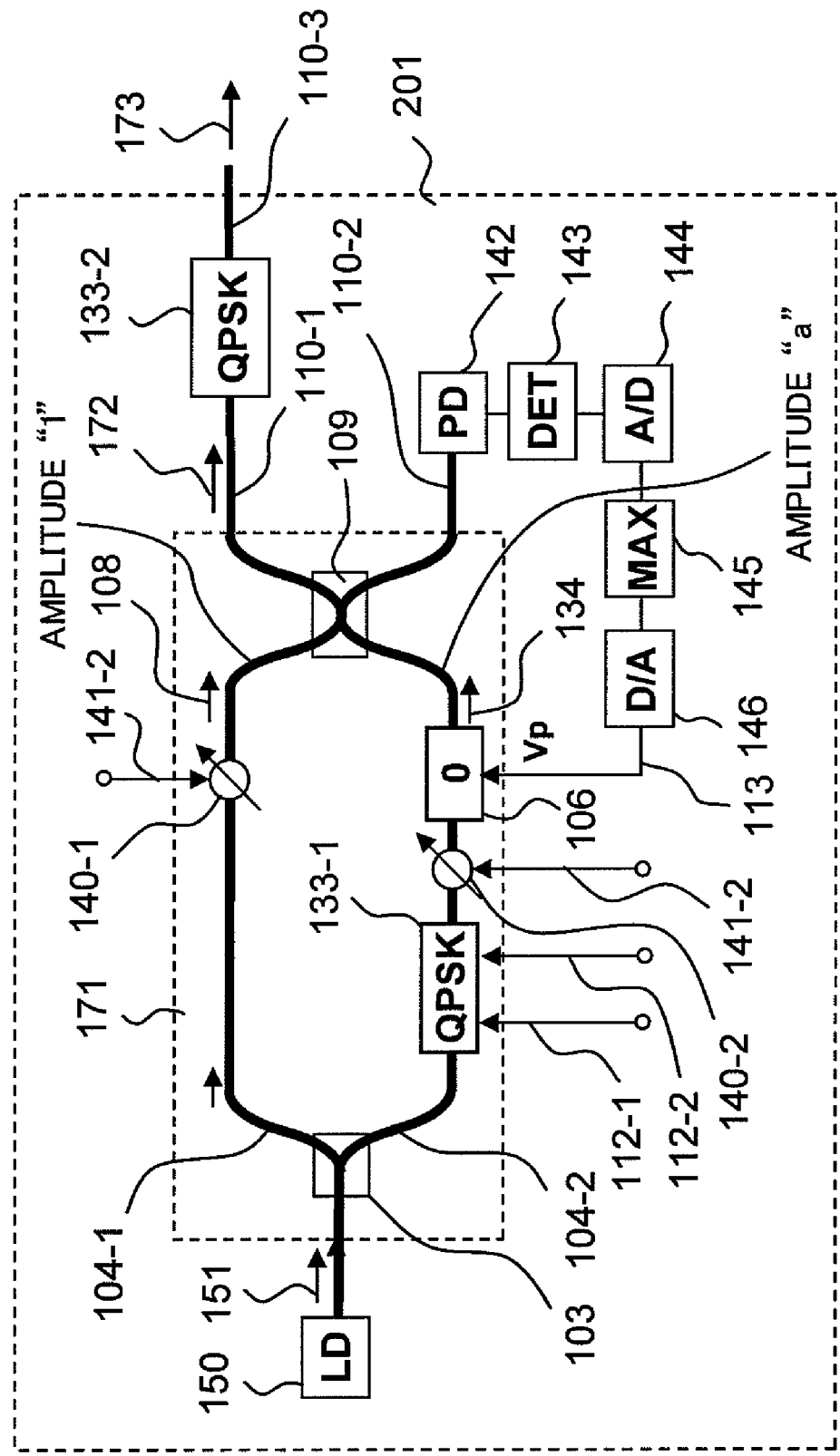
FIG. 24 is a diagram showing a configuration of a 16QAM optical transmitter according to the seventh embodiment of the present invention.
Figure 27:
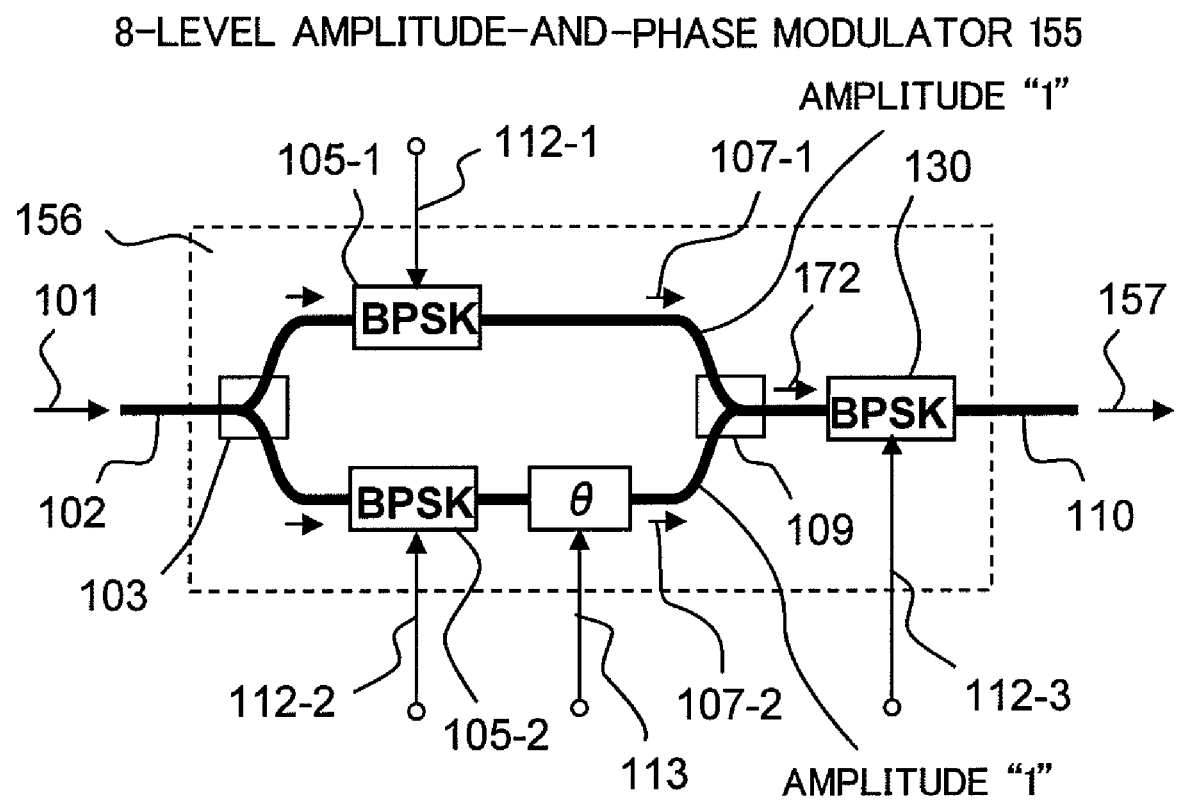
FIG. 27 is a diagram showing a configuration of an 8-level optical amplitude-and-phase modulator according to the eighth embodiment of the present invention.
Figure 29:
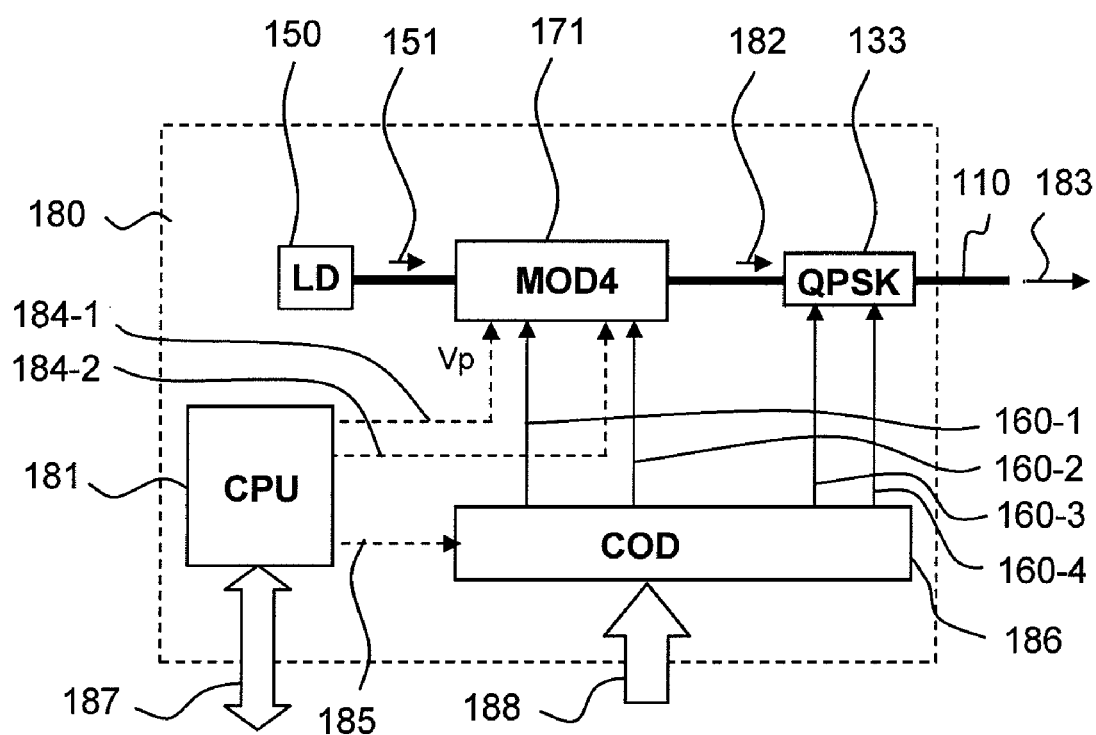
FIG. 29 is a diagram showing a configuration of a variable multilevel optical transmitter according to the ninth embodiment of the present invention.
Figure 31:
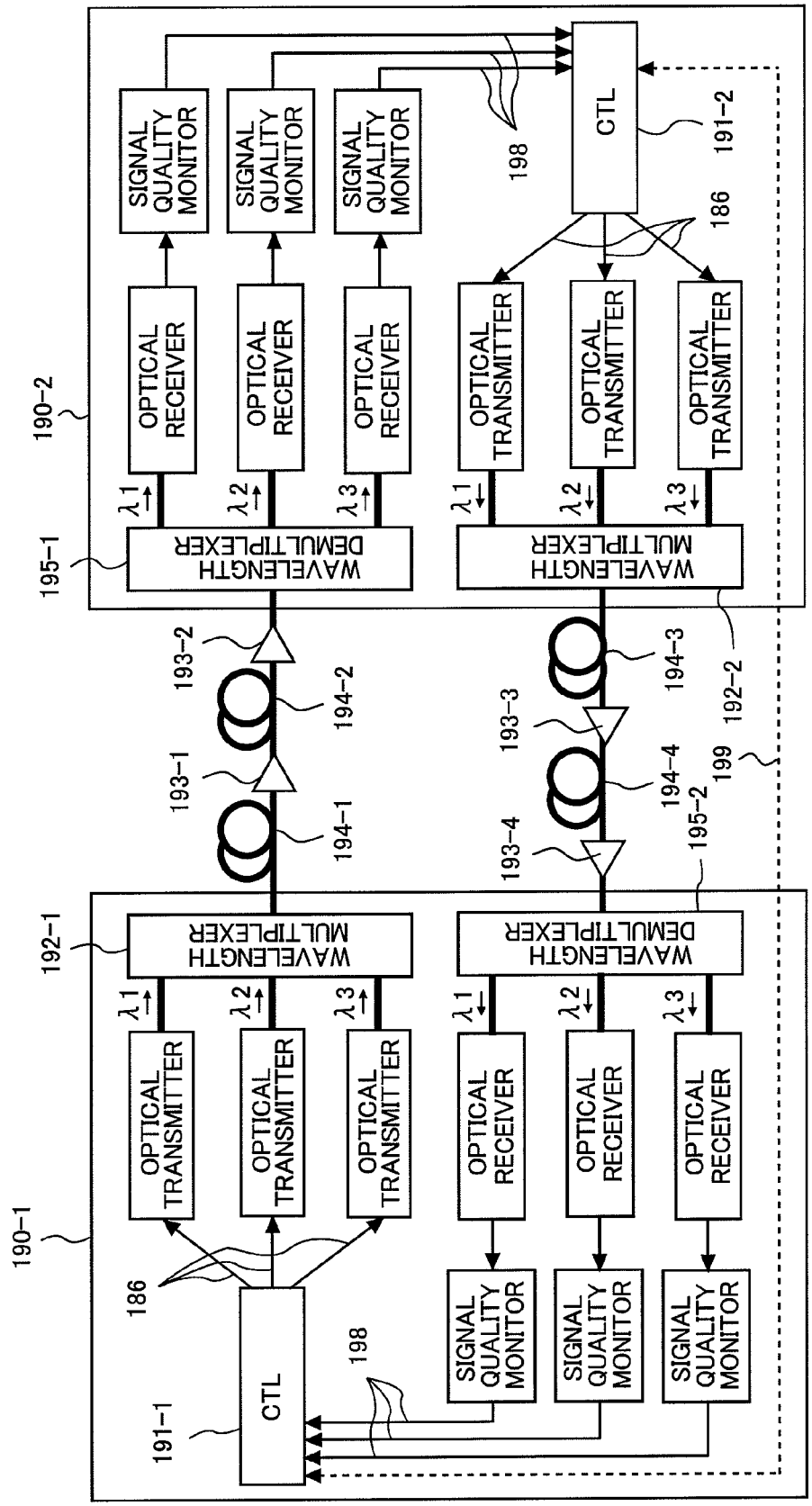
FIG. 31 is a diagram showing a configuration of a wavelength multiplexing optical transmission system using a variable multilevel optical modulator according to the tenth embodiment of the present invention.
Figure 32:
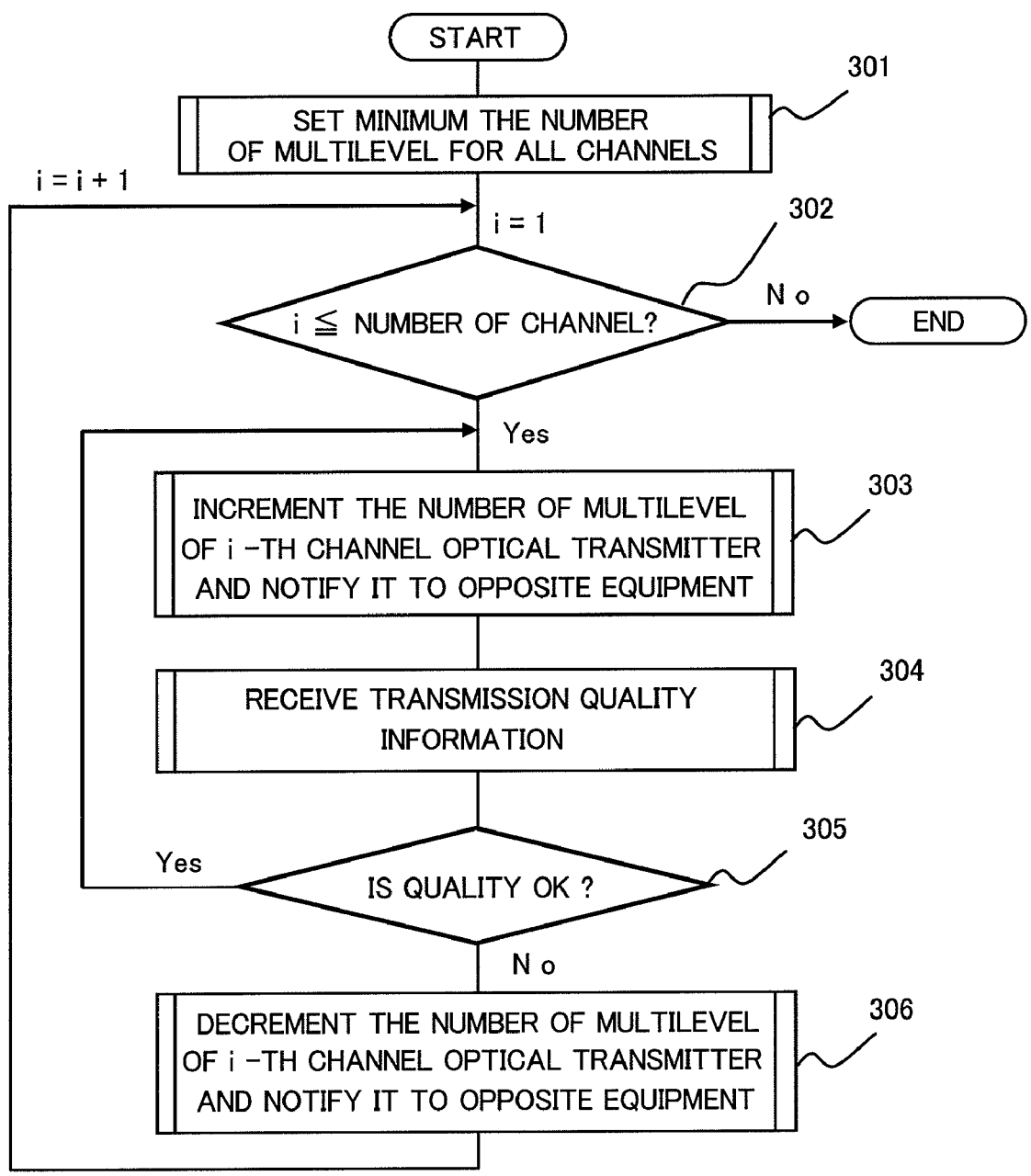
FIG. 32 is a flow chart of a routine for setting the number of signal levels in the tenth embodiment.

100: Quaternary optical amplitude modulator of the invention
101: Input light
102: Input optical path
103: Optical splitter
104: Optical path
105: Single drive MZ type binary optical phase modulator
106: Optical phase adjuster
107: Binary phase modulated signal
108: Continuous wave light
109: Optical coupler
110: Output optical path
111: Output light with quaternary amplitude modulation
112: Modulated signal input terminal
113: Bias terminal
120: Single drive chirp-less MZ type optical modulator
130: Binary optical phase modulator 133: Quadrature quaternary phase modulator
140: Variable optical attenuator
141: Attenuation control terminal
142: Photo detector
143: RF detector
144: A/D converter
145: Maximum value control unit
146: D/A converter
150: Semiconductor laser light source
151: Continuous wave light
152: Quadrature quaternary phase modulated (QPSK) light
153: Binary optical amplitude modulator of the invention
154: Quaternary optical amplitude-and-phase modulator of the invention
155: Duobinary modulator of the invention
156, 200: 8-level optical amplitude-and-phase modulator
201: 16QAM optical transmitter of the invention
171: Quaternary amplitude and phase modulator
180: Variable multilevel optical transmitter of the invention
190: Optical WDM transmission equipment of the invention
191: WDM end office control unit
192: Wavelength multiplexer
193: Optical amplifier
194: Optical fiber transmission path
195: Wavelength demultiplexer
196: Variable multilevel optical receiver
197: Signal quality monitor
199: Communication line

What is claimed is:

1. An optical modulator comprising:
an input optical path;
an optical splitter for splitting optical signal light input from said input optical path into N optical paths, wherein is an integer of 2 or more;
one or more of K-level optical phase modulators arranged in N−1 of said N optical paths; and
an optical coupler for interfering output light from said N optical paths with each other in the same polarization state to send out interfered light as an output optical signal to an output optical path,
wherein one of said N optical paths has no optical phase modulator and amplitude modulated light having amplitude values which is K raised to the power of N−1 or less, or multilevel amplitude-and-phase modulated light modulated in both the amplitude and phase and having signal points which is K raised to the power of N−1 or less, is output to said output optical path, by interfering output light from the N−1 optical paths having said optical phase modulator with output light from the optical path having no optical phase modulator at the same phase or any phase angles other than $\pm\pi/2$.

2. The optical modulator according to claim 1, wherein at least one of said N optical paths has an optical phase adjuster for adjusting a phase difference with respect to the output light of specific one of the other optical paths.

3. The optical modulator according to claim 2, further comprising
a phase control unit for automatically controlling said optical phase adjuster so as to maximize an amplitude modulated component of said output optical signal.

4. The optical modulator according to claim 3, wherein
at least two of said N optical paths have said optical phase adjusters in the case where N is larger than 2, and each of the optical phase adjusters is controlled by said phase control unit so that the amplitude modulated component of the output optical signal is maximized.

5. The optical modulator according to claim 4, wherein
said N optical paths are coupled by a plurality of couplers arranged in a multi-stage in such a manner that optical light output from a pair of said optical paths is interfered with each other by first one of said couplers and further interfered with optical signal output from another optical path by second one of said couplers, said optical phase adjusters includes a first optical adjuster arranged in one of said pair of optical paths and a second optical adjuster arranged in said another optical path, and said phase control unit controls said first optical phase adjuster based on output light of said first one of optical couplers and said second optical adjuster based on output light of said second one of optical couplers so that the amplitude modulated component of the output light output from each of the optical couplers is maximized.

6. The optical modulator according to claim 1, wherein at least each of said N−1 optical paths having said optical phase modulator includes a variable optical attenuator for adjusting the amplitude of the optical signal light so that the output light from said N optical paths is interfered at a predetermined amplitude ratio.

7. The optical modulator according to claim 1, wherein at least one of said N optical paths includes an optical phase adjuster for adjusting a phase difference from the output light of specific one of the other optical paths, and each of said N−1 optical paths having said optical phase modulator includes a variable optical attenuator for adjusting the amplitude of the optical signal light.

8. The optical modulator according to claim 1, further comprising:

a second optical phase modulator connected in tandem to said output optical path so that the number of signal levels or signal constellation of modulated light output from the second optical phase modulator changes in accordance with the amplitude modulated light or the multilevel amplitude-and-phase modulated light output to the output optical path.

9. The optical modulator according to claim 1, wherein said optical phase modulator is composed of a waveform distortion suppressing type binary phase modulator having a function of suppressing inter-symbol interference.

10. The optical modulator according to claim 1, wherein said optical phase modulator is one of a binary phase modulator of modulation factor $\pi$, a binary phase modulator of arbitrary modulation factor and a quadrature quaternary phase modulator, each of which is composed of at least one single drive Mach-Zehnder modulator or a dual drive Mach-Zehnder modulator.

11. The optical modulator according to claim 1, wherein at least two of said N optical paths have said optical phase modulator in the case where N is larger than 2, and binary electrical digital signals are supplied independently as modulation signals to the optical phase modulators at bit timing matched with each other.

12. An optical modulator for generating a modulated optical signal to an output optical path by splitting input light from an input optical path into N optical paths, wherein N is an integer of 2 or more, and by interfering output light from the N optical paths with each other, wherein:

each of N−1 optical path or paths among said N optical paths has a binary optical phase modulator for generating binary phase modulated light having signal phase points at phase 0 and phase $\pi$, and one of said N optical paths has no optical phase modulator; and binary or more levels of multilevel amplitude modulation or ternary or more levels of multilevel amplitude-and-phase modulation modulated in both amplitude and phase is applied to the input light input to said input optical path, by interfering at output light from the N−1 optical paths having said optical phase modulator with output light from the optical path having no optical phase modulator at the same phase or any phase angles other than $\pm\pi/2$.

13. The optical modulator according to claim 12, wherein at least two of said N optical paths have said binary optical phase modulators, all of which are Mach-Zehnder type optical phase modulators.

* * * * *